US010880952B2

(12) United States Patent
Chou et al.

(10) Patent No.: US 10,880,952 B2
(45) Date of Patent: Dec. 29, 2020

(54) APPARATUS AND METHOD OF LWA AND LWIP CONFIGURATION, PERFORMANCE AND FAULT MANAGEMENT

(71) Applicant: Apple Inc., Cupertino, CA (US)

(72) Inventors: Joey Chou, Scottsdale, AZ (US); Yizhi Yao, Chandler, AZ (US)

(73) Assignee: Apple Inc., Cupertino, CA (US)

( * ) Notice: Subject to any disclaimer, the term of this patent is extended or adjusted under 35 U.S.C. 154(b) by 84 days.

(21) Appl. No.: 16/240,322

(22) Filed: Jan. 4, 2019

(65) Prior Publication Data

US 2019/0141785 A1    May 9, 2019

Related U.S. Application Data

(60) Provisional application No. 62/616,813, filed on Jan. 12, 2018, provisional application No. 62/616,999, filed on Jan. 12, 2018.

(51) Int. Cl.

| H04W 4/00 | (2018.01) |
|---|---|
| H04W 88/18 | (2009.01) |
| H04W 76/12 | (2018.01) |
| H04L 29/06 | (2006.01) |
| H04W 24/10 | (2009.01) |
| H04W 8/08 | (2009.01) |
| H04L 12/26 | (2006.01) |
| H04W 24/08 | (2009.01) |
| H04W 84/12 | (2009.01) |

(52) U.S. Cl.
CPC ......... *H04W 88/18* (2013.01); *H04L 43/0823* (2013.01); *H04L 63/0485* (2013.01); *H04L 63/164* (2013.01); *H04W 8/08* (2013.01); *H04W 24/08* (2013.01); *H04W 24/10* (2013.01); *H04W 76/12* (2018.02); *H04W 84/12* (2013.01)

(58) Field of Classification Search
CPC ...... H04W 72/04; H04W 88/08; H04W 76/00
See application file for complete search history.

(56) References Cited

U.S. PATENT DOCUMENTS

| 2016/0105809 A1* | 4/2016 | Chou | H04L 41/0226 370/216 |
|---|---|---|---|
| 2019/0014612 A1* | 1/2019 | Lee | H04W 76/38 |
| 2019/0045560 A1* | 2/2019 | Yao | H04L 69/22 |

* cited by examiner

*Primary Examiner* — Siren Wei
(74) *Attorney, Agent, or Firm* — Kowert, Hood, Munyon, Rankin & Goetzel, P.C.

(57) ABSTRACT

An apparatus and method for CM, PM and FM of LWA and LWIP are described. An NM sends a management request to an EM for management of an IOC instance for LWA or LWIP. The EM manages the IOC instance based on the request and returns a response to the request. The response indicates a result of the request or a result of management of the IOC instance. The EM collects, from the network functions, performance measurements and alarms related to the LWA or LWIP. The collected information is provided to the NM. The NM and EM take an action based on the collected information.

20 Claims, 7 Drawing Sheets

APPARATUS AND METHOD OF LWA AND LWIP CONFIGURATION, PERFORMANCE AND FAULT MANAGEMENT

PRIORITY CLAIM

This patent application claims the benefit of priority under 35 U.S.C. Section 119(e) to U.S. Provisional Patent Application Ser. No. 62/616,813, filed on Jan. 12, 2018, and U.S. Provisional Patent Application Ser. No. 62/616,999, filed on Jan. 12, 2018, each of which is hereby incorporated by reference herein in its entirety.

TECHNICAL FIELD

Embodiments described herein generally relate to radio access networks. Some embodiments relate to Network Function Virtualization (NFV) in cellular networks, including Third Generation Partnership Project Long Term Evolution (3GPP LTE) networks and LTE advanced (LTE-A) networks as well as $4^{th}$ generation (4G) networks and $5^{th}$ generation (5G) networks. Some embodiments relate to configuration management (CM), performance management (PM) and fault management (FM) of LTE Wireless Local Area Network (WLAN) Aggregation (LWA) and LTE WLAN Radio Level Integration with IPsec Tunnel (LWIP).

BACKGROUND

The use of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) systems.

To this end, multiple different technologies have been implemented. LWA and LWIP is one such technology in which both LTE (licensed band) and Wi-Fi (unlicensed band) links may be used simultaneously. LWA aggregates LTE and Wi-Fi at the packet data convergence protocol (PDCP) layer, while LWIP aggregates or switches between LTE and Wi-Fi links at the IP layer.

To add complexity to the variety of services provided by the network devices, many physical implementations of the network devices are propriety and may be unable to incorporate new or adjusted physical components to compensate for different network conditions. This has led to the development of Network Function Virtualization (NFV), which may provide a virtualized environment able to provide any network function or service able to be delivered on general purpose computing systems in a data center as software applications called Virtual Network Functions (VNFs). The use of NFV may provide flexibility in configuring network elements, enabling dynamic network optimization and quicker adaptation of new technologies.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
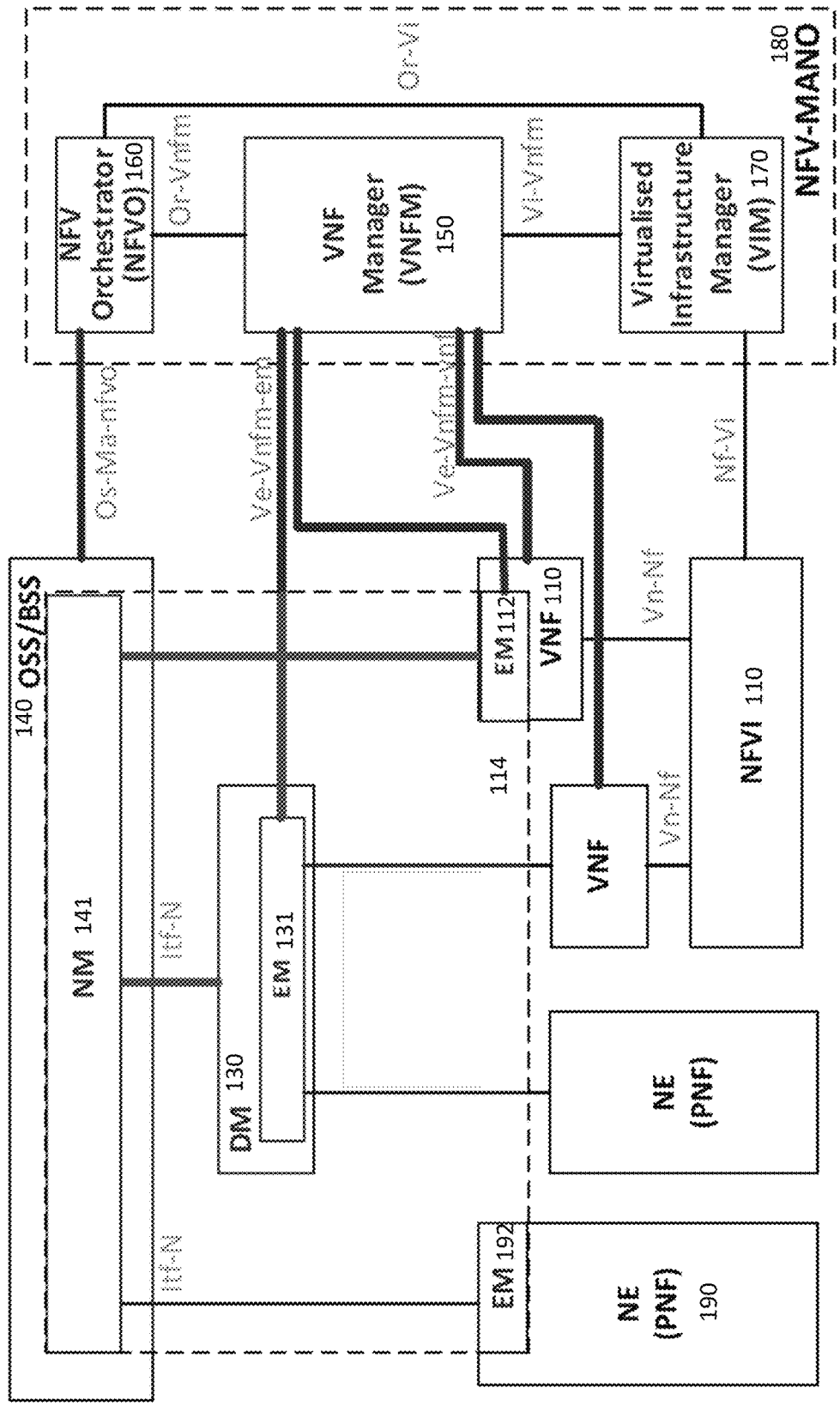
FIG. 1 illustrates a NFV network management architecture in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As above, LWA and LWIP have been used to, for example, increase data throughput. LWA and LWIP allow a UE in RRC_CONNECTED state to be configured by the eNB to utilize the radio resources of WLAN. LWA aggregates user data at the PDCP level and delivers LTE-WLAN Aggregation Adaptation Protocol (LWAAP) packet data units (PDUs) between the eNB and WLAN Termination (WT). LWA supports both co-located and non-co-located deployment scenarios. LWIP integrates the LTE and WLAN at the IP level, and connects the eNB and WLAN over IP. The IP Packets (user data) transferred between the UE and LWIP-security gateway (SeGW) are encapsulated using IPsec to provide security to the packets that traverse the WLAN. The IP packets are then transported between the LWIP-SeGW and eNB.

The Operations, Administration and Maintenance (OAM) aspects of LWA (for both co-located and non-co-located deployment scenarios) and LWIP include: configuration of WLAN related information to the eNB to support LWA and LWIP, how the 3GPP management system manages the WT function when the WT function is implemented in a 3GPP or non-3GPP network element (e.g., WLAN AC, WLAN AP), the management model for WT for co-located and non-co-located LWA deployment scenarios, the management of WLAN mobility set for LWA and LWIP, the performance measurements to monitor the LWA and LWIP, and the FM of LWA and LWIP.

In the non-collocated LWA scenario, the WT terminates the Xw interface for the WLAN. In the collocated LWA scenario, the interface between LTE and WLAN is up to implementation. The deployment of the eNB and WLAN APs may have the following characteristics: one eNB may overlay a specific set of the WLAN APs; one WLAN may be overlaid by multiple eNBs; the WLAN AP overlaid by an eNB may or may not support LWA feature; one WT may support a specific set of WLAN APs, which may be overlaid by the same or different eNB(s); and one WT may have Xw interface with multiple eNB s.

To this end, various use cases and requirements are defined. In particular, the use cases and requirements on CM of LWA and LWIP include provision of WLAN information to a WT for non-collocated LWA; provision of WLAN information to an evolved NodeB (eNB) for collocated LWA; configuration of WLAN mobility sets for LWA and LWIP; and configuration of eNB for LWIP. New Network Resource Models (NRMs) are defined, while the existing interface Integrated Reference Points (IRPs), e.g., Basic CM IRP, Bulk CM IRP, Kernel CM IRP, etc., are reused for CM of LWA and LWIP. Defining new performance measurements, while reusing the existing PM IRP for PM of LWA and LWIP, and the Network Manager (NM) is enabled to correlate the performance measurements of 3GPP networks and WLAN access point (AP).

The use cases and requirements on PM and FM of LWA and LWIP include monitoring of user data transmission on the Xw interface for non-collocated LWA; monitoring of XwAP procedures for non-collocated LWA; monitoring of user data transmission via WLAN for LWIP; monitoring of RRC procedures for LWA; monitoring of RRC procedures for LWIP; alarm monitoring for non-collocated LWA; and alarm monitoring for LWIP. Alarm IRPs for FM of LWA and LWIP are reused and the Network Manager (NM) is enabled to correlate the alarms of 3GPP networks and WLAN access point (AP), for FM of LWA and LWIP. Note that all of the 3GPP TS and TR sections discussed herein are incorporated herein by reference. In addition, although sections of TR 32.868 are referred to, the NRMs for CM may be found in TS 28.658 while the performance measurements for PM may be found in TS 32.425.

In some embodiments, the network may be implemented purely in software. FIG. 1 illustrates a NFV network management architecture in accordance with some embodiments. As illustrated, the NFV network management architecture 100 may include a number of elements (each of which may contain physical and/or virtualized components), including a Network Virtualization Function Infrastructure (NVFI) 110, Network elements (NEs) 190, Virtual Network Functions (VNFs) 120, a Domain Manager (DM) 130, an Element Manager (EM) 132, a Network Manager (NM) 142, and a NFV Management and Orchestration (NFV-MANO) 180. The NFV-MANO 180, which may be replaced as indicated herein by multiple NFV-MANO, may comprise a Virtualized Infrastructure Manager (VIM) 140, a VNF Manager (VNFM) 150, and a Network Function Virtualization Orchestrator (NFVO) 160. The NM 142 may be contained in an Operations Support System/Business Support System (OSS/BSS) 120, with the DM 130 and NM 142 forming the 3GPP management system 114.

The NFV network management architecture 100 may be implemented by, for example, a data center comprising one or more servers in the cloud. The NFV network management architecture 100, in some embodiments, may include one or more physical devices and/or one or more applications hosted on a distributed computing platform, a cloud computing platform, a centralized hardware system, a server, a computing device, and/or an external network-to-network interface device, among others. In some cases, the virtualized resource performance measurement may include, for example, latency, jitter, bandwidth, packet loss, nodal connectivity, compute, network, and/or storage resources, accounting, fault and/or security measurements. In particular, the NEs 190 may comprise physical network functions (PNF) including both hardware such as processors, antennas, amplifiers, transmit and receive chains, as well as software. The VNFs 120 may be instantiated in one or more servers. Each of the VNFs 120, DM 130 and the NEs 190 may contain an EM 122, 132, 192.

The NFV Management and Orchestration (NFV-MANO) 180 may manage the NFVI 110. The NFV-MANO 180 may orchestrate the instantiation of network services, and the allocation of resources used by the VNFs 120. The NFV-MANO 180 may, along with the OSS/BSS 140, be used by external entities to deliver various NFV business benefits. The OSS/BSS 140 may include the collection of systems and management applications that a service provider may use to operate their business: management of customers, ordering, products and revenues—for example, payment or account transactions, as well as telecommunications network components and supporting processes including network component configuration, network service provisioning and fault handling. The NFV-MANO 180 may create or terminate a VNF 120, increase or decrease the VNF capacity, or update or upgrade software and/or configuration of a VNF. The NFV-MANO 180 may include a Virtualized Infrastructure Manager (VIM) 170, a VNF Manager (VNFM) 150 and a NFV Orchestrator (NFVO) 160. The NFV-MANO 180 may have access to various data repositories including network services, VNFs available, NFV instances and NFVI resources with which to determine resource allocation.

The VIM 170 may control and manage the NFVI resources via Nf-Vi reference points within the infrastructure sub-domain. The VIM 170 may further collect and forward performance measurements and events to the VNFM 150 via Vi-VNFM and to the NFVO 160 via Or-Vi reference points. The NFVO 160 may be responsible for managing new VNFs and other network services, including lifecycle management of different network services, which may include VNF instances, global resource management, validation and authorization of NFVI resource requests and policy management for various network services. The NFVO 160 may coordinate VNFs 120 as part of network services that jointly realize a more complex function, including joint instantiation and configuration, configuring required connections between different VNFs 120, and managing dynamic changes of the configuration. The NFVO 160 may provide this orchestration through an OS-Ma-NFVO reference point with the NM 142. The VNFM 150 may orchestrate NFVI resources via the VIM 170 and provide overall coordination and adaptation for configuration and event reporting between the VIM 120 and the EMs and NMs. The former may involve discovering available services, managing virtualized resource availability/allocation/release and providing virtualized resource fault/performance management. The latter may involve lifecycle management that may include instantiating a VNF, scaling and updating the VNF instances, and terminating the network service, releasing the NFVI resources for the service to the NFVI resource pool to be used by other services.

The VNFM 150 may be responsible for the lifecycle management of the VNFs 120 via the Ve-VNFM-VNF reference point and may interface to EMs 122, 132 through the Ve-VNFM-EM reference point. The VNFM 150 may be assigned the management of a single VNF 120, or the management of multiple VNFs 120 of the same type or of different types. Thus, although only one VNFM 150 is shown in FIG. 1, different VNFMs 150 may be associated with the different VNFs 120 for performance measurement and other responsibilities. The VNFM 150 may provide a number of VNF functionalities, including instantiation (and configuration if required by the VNF deployment template), software update/upgrade, modification, scaling out/in and up/down, collection of NFVI performance measurement results and faults/events information and correlation to VNF instance-related events/faults, healing, termination, lifecycle management change notification, integrity management, and event reporting.

The VIM 170 may be responsible for controlling and managing the NFVI compute, storage and network resources, usually within one operator's Infrastructure Domain. The VIM 170 may be specialized in handling a certain type of NFVI resource (e.g. compute-only, storage-only, networking-only), or may be capable of managing multiple types of NFVI resources. The VIM 170 may, among others, orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g. hypervisors), and discovery of the capabilities and features (e.g. related to usage optimization) of such resources.

The NVFI 110 may itself contain various virtualized and non-virtualized resources. These may include a plurality of virtual machines (VMs) 112 that may provide computational abilities (CPU), one or more memories 114 that may provide storage at either block or file-system level and one or more networking elements 116 that may include networks, subnets, ports, addresses, links and forwarding rules to ensure intra- and inter-VNF connectivity.

Each VNF 120 may provide a network function that is decoupled from infrastructure resources (computational resources, networking resources, memory) used to provide the network function. Although not shown, the VNFs 120 can be chained with other VNFs 120 and/or other physical network function to realize a network service. The virtualized resources may provide the VNFs 120 with desired resources. Resource allocation in the NFVI 110 may simultaneously meet numerous requirements and constraints, such as low latency or high bandwidth links to other communication endpoints.

The VNFs 120, like the NEs 190 may be managed by one or more EMs 122, 132, 192. The EM may provide functions for management of virtual or physical network elements, depending on the instantiation. The EM may manage individual network elements and network elements of a sub-network, which may include relations between the network elements. For example, the EM 122 of a VNF 120 may be responsible for configuration for the network functions provided by a VNF 120, fault management for the network functions provided by the VNF 120, accounting for the usage of VNF functions, and collecting performance measurement results for the functions provided by the VNF 120.

The EMs 122, 132, 192 (whether in a VNF 120 or NE 190) may be managed by the NM 142 of the OSS/BSS 140 through Itf-N reference points. The NM 142 may provide functions with the responsibility for the management of a network, mainly as supported by the EM 132 but may also involve direct access to the network elements. The NM 142 may connect and disconnect VNF external interfaces to physical network function interfaces at the request of the NFVO 160.

As above, the various components of the system may be connected through different reference points. The references points between the NFV-MANO 180 and the functional blocks of the system may include an Os-Ma-NFVO between the NM 142 and NFVO 160, a Ve-VNFM-EM between the EM 122, 132 and the VNFM 150, a Ve-VNFM-VNF between a VNF 120 and the VNFM 150, a Nf-Vi between the NFVI 110 and the VIM 170, an Or-VNFM between the NFVO 160 and the VNFM 150, an Or-Vi between the NFVO 160 and the VIM 170, and a Vi-VNFM between the VIM 170 and the VNFM 150. An Or-Vi interface may implement the VNF software image management interface and interfaces for the management of virtualized resources, their catalogue, performance and failure on the Or-Vi reference point. An Or-Vnfm interface may implement a virtualized resource management interface on the Or-Vnfm reference point. A Ve-Vnfm interface may implement a virtualized resource performance/fault management on the Ve-Vnfm reference point.

Figure 2:
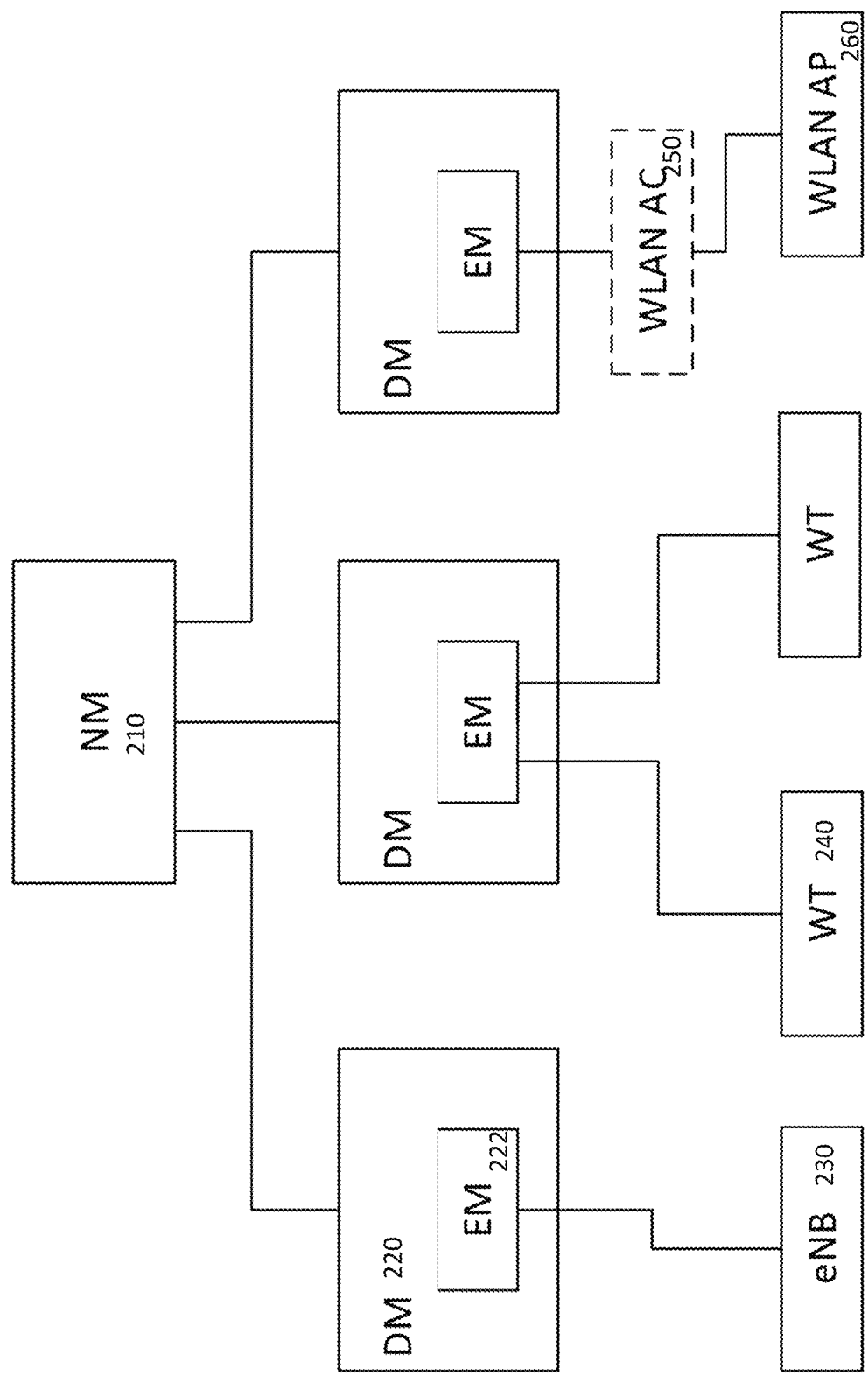
FIG. 2 illustrates a LWA/LWIP management architecture in accordance with some embodiments.

FIG. 2 illustrates a LWA/LWIP management architecture in accordance with some embodiments. The architecture shown in FIG. 2 in some respect may be similar to that of FIG. 1 in that the NM 210 may be able to manage at least an eNB 230, a WT 240, a WLAN AP 260 all via EMs 222 in different DMs 220. The NM 210, DM 220 and EM 222 may be implemented in software on a server. The eNB 230, WT 240, WLAN AP 260 may be implemented in hardware, software (i.e., VNFs) or firmware. As shown, different EMs 222 may be associated with different types of elements being managed. Also, as shown, each EM 222 may manage one or more of the same or different types of elements (e.g., WT 240). The WLAN AP 260, in some cases may be a WLAN access controller (WLAN AC) 250. As described herein, the NM 210 may configure the various functions (e.g., eNB 230) via the EM 222 (i.e., apply CM), and receive the PM and FM information from the functions via the EM 222. The NM 210 may determine actions to take based on the PM measurements and FM information.

Figure 3:
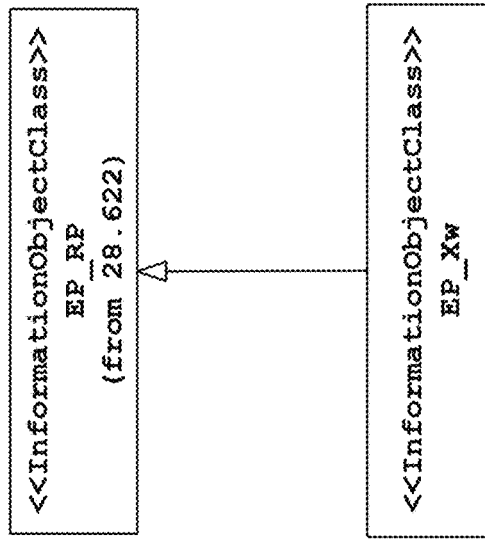
FIG. 3 illustrates inheritance of a WTFunction in accordance with some embodiments.

FIG. 3 illustrates inheritance of a WTFunction in accordance with some embodiments. For CM, a number of interface Integration Reference Points (IRPs) may be present in the NFV architecture. The CM-related interface IRPs are applicable to manage both collocated and non-collocated LWA and LWIP without employing additional changes. To execute CM for LWA and/or LWIP, the NM may generate and transmit to an EM a request to manage one or more Managed Object (MO) instances (MOI) of one or more managed object classes (MOC) and receive a response from the EM about the result of the request. The MOCs may be referred to as Information Object Classes (IOCs). A MO is a software object that encapsulates the manageable characteristics and behavior of a particular Network Resource. The IOC has attributes (properties) that provide information used to characterize the objects that belong to the class. The IOC may support notifications that provide information about an event occurrence within a network resource.

For example, for CM of WT for non-collocated LWA, as described in section 5.1.1.1 of 3GPP TR 32.868, and the corresponding requirements REQ-CM_NonCo_L-WA_CON-1 and REQ-CM_NonCo_LWA_CON-2, an IOC WTFunction may be defined in TS 28.658 to represent the WT functionality. 3GPP TS 36.300 may provide additional information about the WT. The IOC WTFunction may inherit attributes from the IOC ManagedFunction (see TS 28.622) as shown in FIG. 3.

The various LWA configuration management requirements may include: REQ-CM_NonCo_LWA_CON-1: the EM should have a capability allowing the NM to provision the WLAN information to the WT for non-collocated LWA; REQ-CM_NonCo_LWA_CON-2: the EM should have a capability allowing the NM to provision the LWA relation to the WT for non-collocated LWA; REQ-CM_Co_LWA_CON-1: the EM should have a capability allowing the NM to provision the WLAN information to the eNB for collocated LWA; REQ-CM_LWA_CON-1: the EM should have a capability allowing the NM to create, modify and delete a WLAN mobility set for an eNB, for both collocated LWA and non-collocated LWA; REQ-CM_LWA_CON-2: the EM should have a capability allowing the NM to add, remove WLAN AP information to/from a WLAN mobility set and modify WLAN AP information in a WLAN mobility set for an eNB, for both collocated LWA and non-collocated LWA.

The various LWA performance management requirements, which are applicable to non-collocated LWA, may include: REQ-PM_NonCo_LWA_CON-1: the EM should have a capability allowing the NM to collect the performance measurements related to user data transmission over the Xw interface from the eNB and/or WT for non-collocated LWA and REQ-PM_NonCo_LWA_CON-2: the EM should have a capability allowing the NM to collect the performance measurements related to the following XwAP procedures for non-collocated LWA: WT Configuration Update; WLAN Status Reporting; LTE-WLAN Aggregation procedures (including WT Addition, WT Association Confirmation, eNB Initiated WT Modification, WT Initiated WT Modification, and eNB Initiated WT Release and WT Initiated WT Release).

The various LWA performance management requirements, which are applicable to both collocated LWA and non-collocated LWA, may include: REQ-PM_NonCo_LWA_CON-1: REQ-PM_LWA_CON-1: the EM should have a capability allowing the NM to collect the performance measurements related to the following RRC procedures for LWA: LWA WLAN mobility set configuration; WLAN connection status reporting; WLAN measurements reporting; and LWA specific DRB addition or reconfiguration.

The various LWA fault management requirements may include REQ-FM_NonCo_LWA_CON-1: the EM should have a capability to send alarms related to the non-collocated LWA to the NM. The alarms are related to a WT, a WLAN AP connected to the WT, or an Xw interface, and the alarms may include detailed information (such as probable cause and location of the faulty part) to facilitate operator to solve the problems.

The various LWIP configuration management requirements may include: REQ-CM_LWIP_CON-1: the EM should have a capability allowing the NM to configure the LWIP related information for an eNB. The LWIP related information includes the IP address of the LWIP-SeGW, and the identifiers BSSID, HESSID and SSID of WLAN APs for LWIP; REQ-CM_LWIP_CON-2: the EM should have a capability allowing the NM to create, modify and delete a WLAN mobility set for LWIP for an eNB; and REQ-CM_LWIP_CON-3: the EM should have a capability allowing the NM to add, remove WLAN AP information to/from a WLAN mobility set and modify the WLAN AP information in a WLAN mobility set for LWIP for an eNB.

The various LWIP performance management requirements may include: REQ-PM_LWIP_CON-1: the EM should have a capability allowing the NM to collect the performance measurements related to user data transmitted or received by an eNB via WLAN for LWIP; and REQ-PM_LWIP_CON-2: the EM of an eNB should have a capability allowing the NM to collect the performance measurements related to the following RRC procedures for LWIP: LWIP WLAN mobility set configuration; WLAN connection status reporting; WLAN measurements reporting; and LWIP specific DRB addition or reconfiguration.

The various LWIP fault management requirements may include REQ-FM_LWIP_CON-1: the EM of an eNB should have a capability to send alarms related to LWIP to the NM. The alarms need to include the detailed information (such as probable cause and location of the faulty part) about the fault to facilitate operator to mitigate the faults.

The IOC WTFunction is to model the WT, and the WTFunction may have the following attributes (in addition to the attributes inherited from IOC ManagedFuncton):

| Attribute name | Support Qualifier | isReadable | isWritable | isInvariant | isNotifyable |
| --- | --- | --- | --- | --- | --- |
| wLANInfoList | M | M | M | — | M |

The attribute properties of IOC WTFunction are as following:

| Attribute Name | Documentation and Allowed Values | Properties |
| --- | --- | --- |
| wLANInfoList | This attribute contains a list of WLANInfo, and each WLANInfo includes the following elements:<br>WLANId<br>This element identifies the WLAN by the BSSID, the SSID, and/or the HESSID (see clause 9.2.7 of TS 36.463).<br>WLANOperationalState<br>This element indicates whether the WLAN is in operation normally or abnormally (e.g., out of service).<br>EnbWithLWARelation<br>This element identifies the eNB, by the DN, with which the subject WLAN has LWA relation.<br>allowedValues: N/A | type: String<br>multiplicity: 0 . . . *<br>isOrdered: N/A<br>isUnique: N/A<br>defaultValue:<br>No default value<br>isNullable: True |

The IOC WTFunction supports the common notifications defined in subclause 4.5 of TS 28.658, which are valid for the IOC WTFunction without exceptions or additions.

Figure 4:
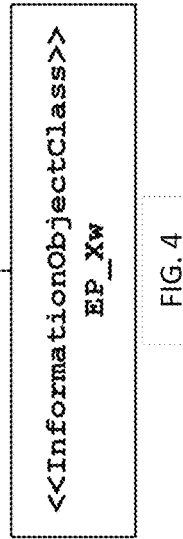
FIG. 4 illustrates inheritance of EP_Xw in accordance with some embodiments.

FIG. 4 illustrates inheritance of EP_Xw in accordance with some embodiments. The EP_Xw IOC is defined in TS 28.658 to represent the end point of the Xw interface (between the eNB and WT). More information about Xw interface may be found in 3GPP TS 36.463 and TS 36.465. The EP_Xw IOC inherits from IOC EP_RP, as described in TS 28.622 and shown in FIG. 4. The EP_Xw IOC may have no new attributes except the attributes inherited from IOC ManagedFuncton). The EP_Xw IOC supports the common notifications defined in subclause 4.5 of TS 28.658, which are valid for the EP_Xw IOC without exceptions or additions.

Figure 5:
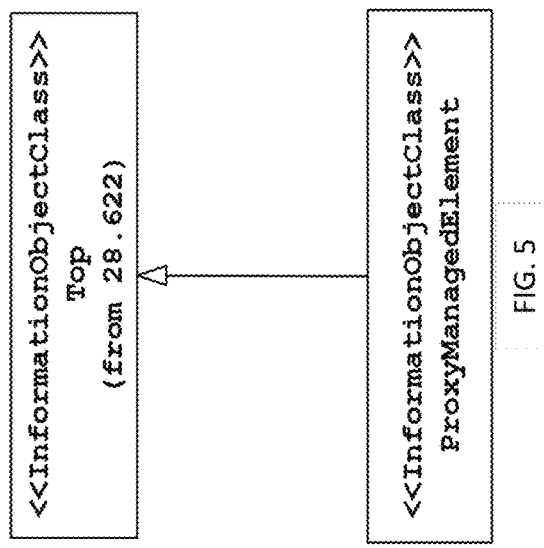
FIG. 5 illustrates inheritance of ProxyManagedElement in accordance with some embodiments.

FIG. 5 illustrates inheritance of ProxyManagedElement in accordance with some embodiments. The IOC ProxyManagedElement may be defined in TS 28.622 to represent a managed element that is not directly managed by a subject IRPAgent but is used as proxy for managing its contained managed functions by the IRPAgent.

Figure 6:
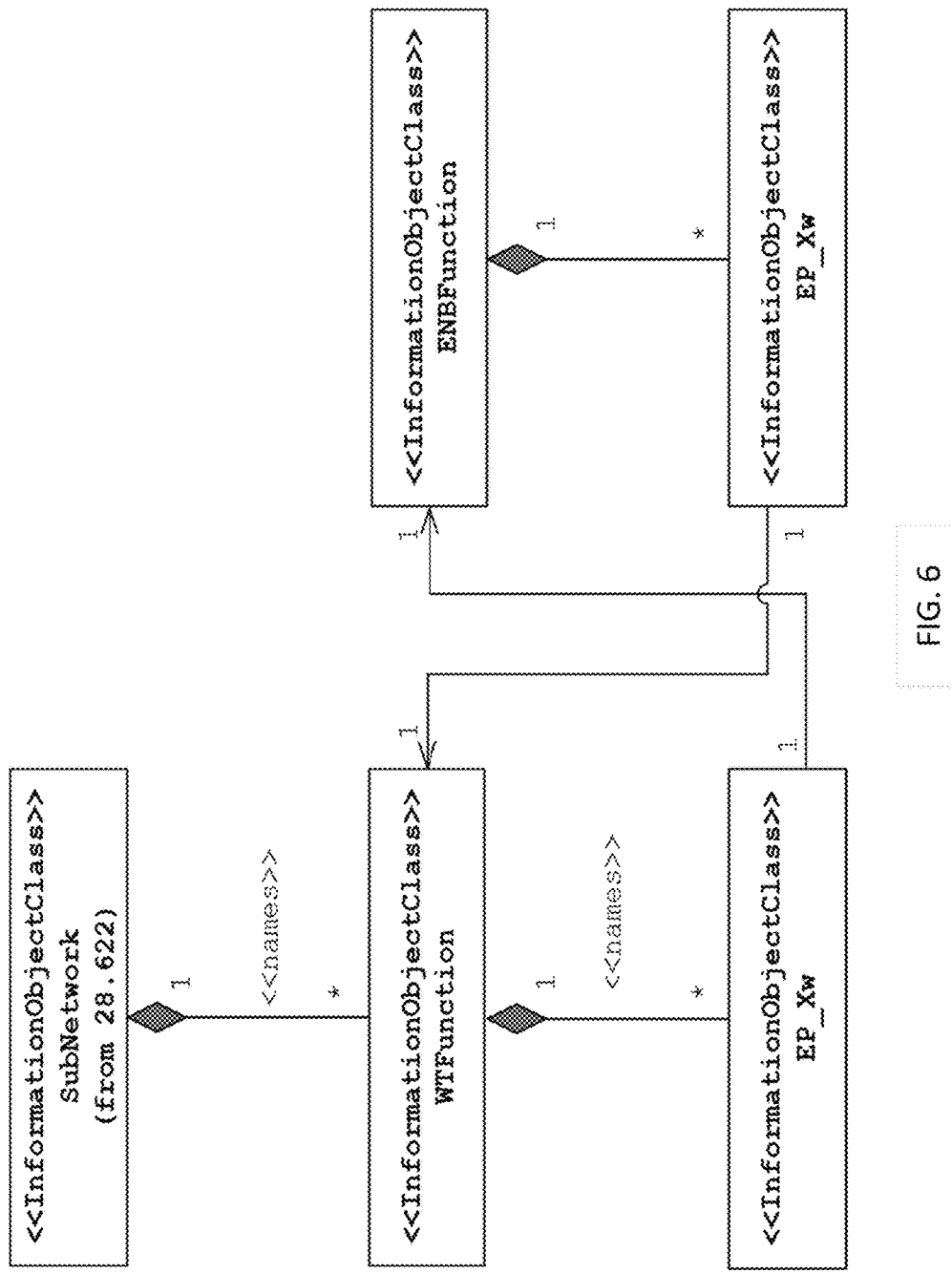
FIG. 6 illustrates relationships of Information Object Classes (IOCs) related to non-collocated LWA (without ProxyManagedElement IOC) in accordance with some embodiments.

The IOC ProxyManagedElement may represent a non-3GPP network element where the 3GPP defined network functions are physically located. A ProxyManagedElement instance may be contained in either a SubNetwork or in a MeContext instance. A single ProxyManagedElement seen over the Itf-N interface may also exist stand-alone with no parent at all. The ProxyManagedElement IOC may be used to represent a combined managed element (ME) functionality, as indicated by the managedElementType attribute and the contained instances of different functional IOCs. In case the ProxyManagedElement instance contains non-3GPP functions, only the contained instances of 3GPP functional IOCs are provided via the Itf-N interface. The ProxyManagedElement IOC inherits from the IOC Top, as indicated in TS 28.622. The ProxyManagedElement IOC has the following attributes, besides the attributes inherited from IOC Top:

as indicated by the *, but the EP_Xw IOC may be contained by only one WTFunction IOC, as indicated by the numeral 1 in the connection between the WTFunction IOC and the EP_Xw IOC. The IOC may indicate a connection with the eNBFunction IOC (i.e., the Xw interface between the WT and the eNB). As the Xw interface is associated with a single WT and eNB, this is indicated in FIG. 6 by the arrow and numeral 1 adjacent to the eNBFunction IOC. Similarly, the eNBFunction contains a EP_Xw IOC, which indicates a connection with the WTFunction IOC.

Figure 7:
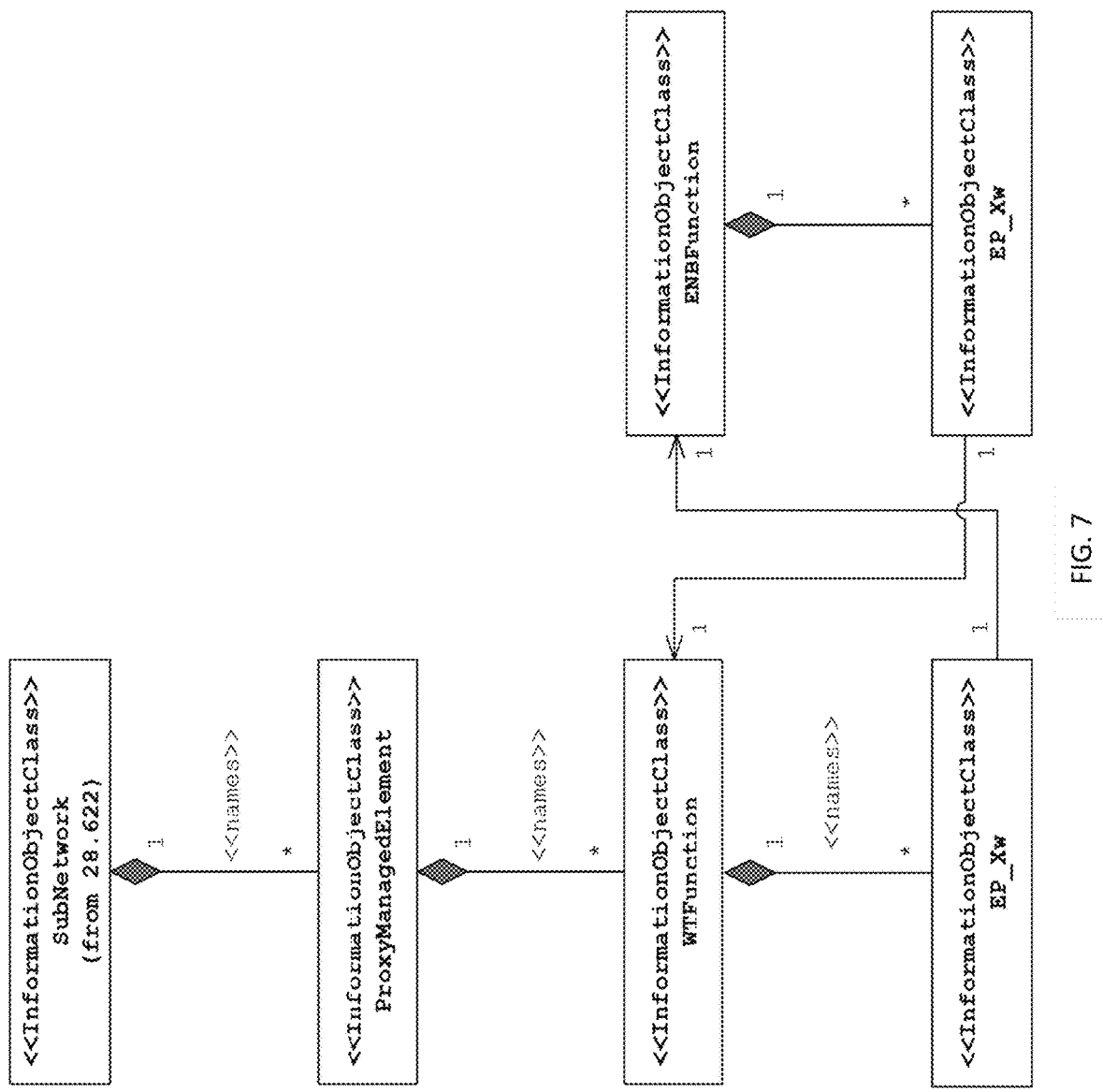
FIG. 7 illustrates relationships of IOCs related to non-collocated LWA (with ProxyManagedElement IOC) in accordance with some embodiments.

FIG. 7 illustrates relationships of IOCs related to non-collocated LWA (with ProxyManagedElement IOC) in accordance with some embodiments. The relationships of the IOCs may be depicted in the class diagram shown in FIG. 7, which is shown with the ProxyManagedElement IOC. The main difference between the relationships shown in FIGS. 6 and 7 is the presence of the ProxyManagedElement between the SubNetwork IOC and the WTFunction IOC.

Use cases and requirements of the network are now described. In a first use case, WLAN information may be provisioned to the eNB for collocated LWA as described in section 5.1.1.2 of TR 32.868 and the corresponding requirements REQ-CM_Co_LWA_CON-1 as documented in section 6.1.1. In a second use case, the WLAN mobility sets may be configured for LWA as described in section 5.1.1.3 of TR 32.868 and the corresponding requirements REQ-CM_LWA_CON-1 and REQ-CM_LWA_CON-2 as documented in section 6.1.1. In a third use case, the eNB may be configured for LWIP as described in section 5.2.1.1 of TR 32.868 and the corresponding requirements REQ-CM_LWIP_CON-1 as documented in section 6.2.1. In a fourth use case, the WLAN mobility sets may be configured for LWIP as described in section 5.2.1.2 of TS and the corresponding requirements REQ-CM_LWIP_CON-2 and REQ-CM_LWIP_CON-3 as documented in section 6.2.1.

| Attribute Name | Support Qualifier | isReadable | isWritable | isInvariant | isNotifyable |
|---|---|---|---|---|---|
| id | M | M | — | M | — |
| vendorName | M | M | — | — | — |
| userDefinedState | M | M | M | — | — |
| managedElementType | M | M | M | — | — |

The configuration notifications as defined in subclause 4.5.2 of TS 28.658 are valid for the ProxyManagedElement IOC.

Figure 8:
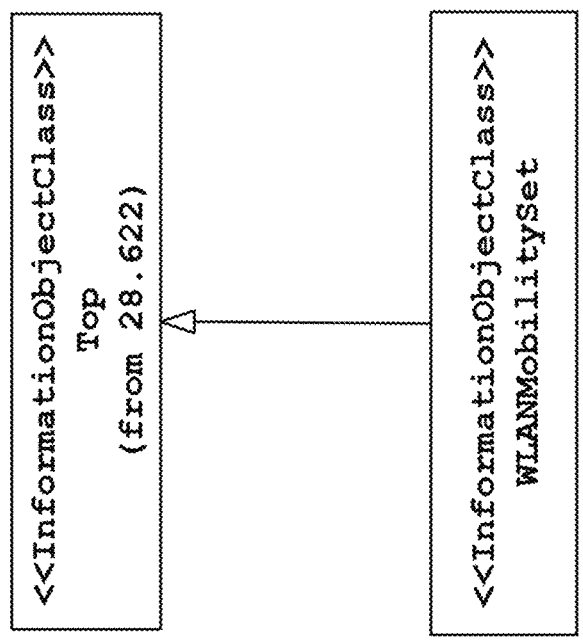
FIG. 8 illustrates inheritance of WLANMobilitySet in accordance with some embodiments.

FIG. 6 illustrates relationships of IOCs related to non-collocated LWA (without ProxyManagedElement IOC) in accordance with some embodiments. The relationships of the IOCs may be depicted in the class diagram shown in FIG. 6, which is shown without the ProxyManagedElement IOC. As shown, the IOC Subnetwork contains the WTFunction IOC. The WTFunction IOC contains an EP_Xw IOC. The WTFunction IOC may contain multiple EP_Xw IOCs, FIG. 8 illustrates inheritance of WLANMobilitySet in accordance with some embodiments. The WLANMobilitySet IOC may be defined in TS 28.658 to represent the WLAN mobility set managed by OAM for LWA and LWIP. For more information about the WLAN mobility set, see 3GPP TS 36.300. The IOC WLANMobilitySet may inherit from the IOC Top as shown in FIG. 8.

The IOC WLANMobilitySet may have the following attributes, besides the attributes inherited from IOC ManagedFuncton:

| Attribute name | Support Qualifier | isReadable | isWritable | isInvariant | isNotifyable |
|---|---|---|---|---|---|
| wLANAPInfoList | M | M | M | — | M |

The attribute properties of IOC WLANMobilitySet are as following:

| Attribute Name | Documentation and Allowed Values | Properties |
|---|---|---|
| wLANAPInfo List | This attribute contains a list of WLANAPInfo, and each WLANAPInfo includes the following elements: WLANAPId This element identifies the WLAN by the BSSID, the SSID, and/or the HESSID (see clause 9.2.7 of TS 36.463 [3]). WLANAPOperationalState This element indicates whether the WLAN AP is in operation normally or abnormally (e.g., out of service). WLANAPGeoLocation (O) This element provides the geographical location of the WLAN AP. IsLWASupported This element indicates whether LWA is supported between the eNB and this WLAN AP. IsLWIPSupported This element indicates whether LWIP is supported between the eNB and this WLAN AP. allowedValues: N/A | type: String multiplicity: 0 . . . * isOrdered: N/A isUnique: N/A defaultValue: No default value isNullable: false |

The common notifications defined in subclause 4.5 of TS 28.658 may be valid for the IOC WLANMobilitySet, without exceptions or additions.

The IOC ENBFunction as defined in TS 28.658 may be enhanced with additional attributes for management of LWIP. The new attributes are added following the existing ones (indicated by (N)).

| Attribute name | Support Qualifier | isReadable | isWritable | isInvariant | isNotifyable |
|---|---|---|---|---|---|
| intraANRSwitch | CM | M | M | — | M |
| iRATANRSwitch | CM | M | M | — | M |
| eNBId | M | M | — | — | M |
| x2BlackList | CM | M | M | — | M |
| x2WhiteList | CM | M | M | — | M |
| x2HOBlackList | CM | M | M | — | M |
| x2IpAddressList | O | M | — | — | M |
| tceIDMappingInfoList | CM | M | M | — | M |
| sharNetTceMappingInfoList | CM | M | M | — | M |
| netListeningRSForRIBS | CM | M | M | — | M |
| lWIPSeGWList (N) | CM | M | M | — | M |

Figure 9:
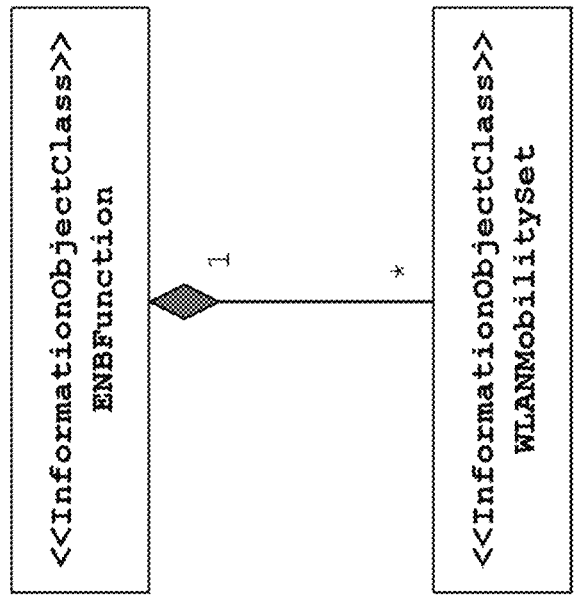
FIG. 9 illustrates relationships of the IOCs related to an evolved NodeB (eNB) for LWA and LWIP in accordance with some embodiments.

The attribute constraint of the support qualifier of lWIPSeGWAddressList is LWIP is supported. The attribute properties of lWIPSeGWAddressList are as following:

FIG. 9 illustrates relationships of the IOCs related to an evolved NodeB (eNB) for LWA and LWIP in accordance with some embodiments.

Thus, in various embodiments, the NM may execute CM for LWA and/or LWIP, by sending a request to manage one or more Managed Object (MO) instances (MOI) of one or more managed object classes (MOC) to an EM and receiving a response from EM about the result of the request. In another embodiment, the EM may execute the CM for LWA and/or LWIP, by receiving a request from NM to manage the

| Attribute Name | Documentation and Allowed Values | Properties |
|---|---|---|
| lWIPSeGWList | This attribute contains a list of lWIPSeGWInfo, and each lWIPSeGWInfo includes the following elements: LWIPSeGWId This element identifies the LWIP SeGW. LWIPSeGWIdAddressList This element provides the IP addresses of the LWIP SeGW. allowedValues: N/A | type: String multiplicity: 0 . . . * isOrdered: N/A isUnique: N/A defaultValue: No default value isNullable: false |

MOI(s) of the MOC(s), managing the MOIs of the MOC(s) per the request; and sending a response to the NM to indicate the result of the request and/or sending a notification to the NM about the result of management of the MOIs.

The MOI may be managed may include one or more of creating the MOI of the MOC; modifying the MOI; or deleting the MOI. The MOC may be: the information object class (IOC) "ENBFunction"; the IOC (e.g., WTFunction) representing the WT; the IOC (e.g., EP_Xw) representing the Xw interface between eNB and WT; the IOC (e.g., ProxyManagedElement) representing a managed element which is not directly managed by the subject IRPAgent (EM or NE), and this IOC is used as a proxy for managing its contained managed functions by the IRPAgent; or the IOC (e.g., WLANMobilitySet) representing the WLAN mobility set managed by OAM for LWA and LWIP.

The IOC "ENBFunction" may contain at least one attribute (e.g., 1WIPSeGWList) indicating the information of the LWIP security gateway(s) (SeGW(s)), including the identifier and/or IP address(es) of each LWIP SeGW.

The IOC (e.g., WTFunction) representing the WT may inherit from the IOC "ManagedFunction"; contain at least one attribute indicating the information of the WLAN(s), including for each WLAN: identifier; operational status; geographical location; and/or, the identifier of the eNB with which the subject WLAN has LWA relation; and be contained by the IOC "SubNetwork" or the IOC (e.g., ProxyManagedElement) representing a managed element which is not directly managed by the subject IRPAgent.

The IOC (e.g., EP_Xw) representing the Xw interface between WT and eNB may: inherit from IOC "EP_RP"; and be contained by IOC "ENBFunction" and/or the IOC (e.g., WTFunction) representing the WT. In this case, multiple instances of the IOC (e.g., EP_Xw) may be contained by an IOC (e.g., WTFunction) to indicate that a WT may have relations with multiple eNBs, or multiple instances of the IOC (e.g., EP_Xw) may be contained by an IOC (e.g., ENBFunction) to indicate that a eNB may have relations with multiple WTs.

The IOC (e.g., ProxyManagedElement) representing a managed element that is not directly managed by the subject IRPAgent may: inherit from the IOC "Top"; contains at least one of the following attributes: the attribute indicating the identifier of this managed element; the attribute indicating the vendor name of this managed element; the attribute indicating the user defined state of this managed element; and the attribute indicating the type (e.g., WLAN AC) of this managed element; and be contained by the IOC "SubNetwork".

The IOC (e.g., WLANMobilitySet) representing the WLAN mobility set managed by OAM for LWA and LWIP may: inherit from the IOC "Top"; contain at least one attribute indicating the information of the WLAN AP(s), including the following information for each WLAN AP: identifier, operational status, geographical location, whether LWA is supported and/or whether LWIP is supported; and be contained by IOC "ENBFunction".

The managed function contained by the IOC (e.g., ProxyManagedElement) representing a managed element that is not directly managed by the subject IRPAgent, may be the IOC (e.g., WTFunction) representing the WT.

The IOC (e.g., ProxyManagedElement) representing a managed element that is not directly managed by the subject IRPAgent, may represent a non-3GPP network element (e.g., WLAN AC) where the 3GPP defined network functions (e.g., WT) are physically located.

Turning to PM, the PM IRP is applicable to manage the measurement job and threshold for LWA and LWIP without the use of changes. For the PM of LWA and LWIP, performance measurements data is used. The performance of LWA and LWIP may be impacted by the performance of the WLAN AP, therefore the following performance measurements for WLAN as defined in TS 28.403 can be used by the NM for correlation with the LWA and LWIP-related performance measurements: IP.InUnicastPacketWlanAP; IP.OutUnicastPacketWlanAP; IP.InMulticastPacketWlanAP; IP.OutMulticastPacketWlanAP; IP.InBroadcastPacketWlanAP; IP.OutBroadcastPacketWlanAP; MAC.SuccRtsWlanAP; MAC.FailRtsWlanAP; MAC.FailAckWlanAP; MAC.successMpduWlanAP; MAC.failedMpduWlanAP; NumberOfAssociatedStation.

For the use case of monitoring of user data transmission on the Xw interface for non-collocated LWA as described in section 5.1.2.1 of TR 28.658 and the corresponding requirements REQ-PM_NonCo_LWA_CON-1 as documented in section 6.1.2 a number of performance measurements may be defined in TS 32.425. The new performance measurements for the eNB may include the number of octets of outgoing and incoming LTE-WLAN Aggregation Adaptation Protocol (LWAAP) PDUs transmitted over the Xw interface, the mean number of UEs associated with the WLAN and the number of UEs for which the outgoing and incoming LWAAP PDUs are transmitted over the Xw interface.

The number of octets of outgoing LWAAP PDUs transmitted over the Xw interface may be a CC counter. The counter may be triggered on transmission of the LWAAP PDUs over the Xw interface by the eNB. The measurement may be split into subcounters per WLAN. The measured object may be the IOC (e.g., EP_Xw) representing the Xw interface (contained by the IOC ENBFunction).

Similarly, the number of octets of incoming LWAAP PDUs transmitted over the Xw interface may be a CC counter. The counter may be triggered on receipt of the LWAAP PDUs over the Xw interface by the eNB. The measurement may be split into subcounters per WLAN. The measured object may be the IOC (e.g., EP_Xw) representing the Xw interface (contained by the IOC ENBFunction).

The mean number of UEs associated with the WLAN may be a SI counter. The SI counter may be obtained by sampling the number of UEs associated with the WLAN at a predefined interval, and then taking the arithmetic mean. The measured object is the IOC (e.g., EP_Xw) representing the Xw interface (contained by the IOC ENBFunction).

The number of UEs for which the outgoing LWAAP PDUs are transmitted over Xw interface may be a CC counter. The counter may be incremented by 1 when the outgoing LWAAP PDUs are transmitted by the eNB to a WT, then to a UE, which has not been counted in the collection period. The measurement may be split into subcounters per WLAN. The measured object may be the IOC (e.g., EP_Xw) representing the Xw interface (contained by the IOC ENBFunction).

Similarly, the number of UEs for which the incoming LWAAP PDUs are transmitted over Xw interface may be a CC counter. The counter may be incremented by 1 when the incoming LWAAP PDUs are received by the eNB from a WT, for a UE, which has not been counted in the collection period. The measurement may be split into subcounters per WLAN. The measured object may be the IOC (e.g., EP_Xw) representing the Xw interface (contained by the IOC ENBFunction).

Similar to the above, the new performance measurements for the WT may include the number of octets of outgoing and incoming LWAAP PDUs transmitted over the Xw interface, the mean number of UEs associated with the WLAN and the number of UEs for which the outgoing and incoming LWAAP PDUs are transmitted over the Xw interface.

The number of octets of outgoing LWAAP PDUs transmitted over the Xw interface may be a CC counter. The counter may be triggered on transmission of the LWAAP PDUs over the Xw interface by the WT. The measurement may be split into subcounters per WLAN. The measured object may be the IOC (e.g., WTFunction) representing the WT.

Similarly, the number of octets of incoming LWAAP PDUs transmitted over the Xw interface may be a CC counter. The counter may be triggered on receipt of the LWAAP PDUs over the Xw interface by the WT. The measurement may be split into subcounters per WLAN. The measured object may be the IOC (e.g., WTFunction) representing the WT.

The mean number of UEs associated with the WLAN may be a SI counter. The SI counter may be obtained by sampling the number of UEs associated with the WLAN at a predefined interval, and then taking the arithmetic mean. The measured object may be the IOC (e.g., WTFunction) representing the WT.

The number of UEs for which the outgoing LWAAP PDUs are transmitted over Xw interface may be a CC counter. The counter may be incremented by 1 when the outgoing LWAAP PDUs are transmitted by the WT to an eNB, then to a UE, which has not been counted in the collection period. The measurement may be split into subcounters per WLAN. The measured object may be the IOC (e.g., WTFunction) representing the WT.

Similarly, the number of UEs for which the incoming LWAAP PDUs are transmitted over Xw interface may be a CC counter. The counter may be incremented by 1 when the incoming LWAAP PDUs are received by the WT from an eNB, for a UE, which has not been counted in the collection period. The measurement may be split into subcounters per WLAN. The measured object may be the IOC (e.g., WTFunction) representing the WT.

For the use case of monitoring of user data transmission on the XwAP interface for non-collocated LWA as described in section 5.1.2.2 of TR 28.658 and the corresponding requirements REQ-PM_NonCo_LWA_CON-2 as documented in section 6.1.2 a number of performance measurements may be defined in TS 32.425. The new performance measurements for each of the eNB and WT may include the number of attempted WT Configuration Updates, the number of failed WT Configuration Updates, the number of WT status requests, the number of WT status failures, the number of WT addition requests, the number of WT addition rejections, the number of eNB-initiated WT modification requests, the number of rejected eNB-initiated WT modifications, the number of WT-initiated WT modification requests, the number of refused WT-initiated WT modifications, the number of eNB-initiated WT releases, and the number of WT-initiated WT releases.

For the eNB: the number of attempted WT Configuration Updates may be a CC counter. The counter may be triggered on receipt of the WT CONFIGURATION UPDATE message (see TS 36.463) by the eNB from the WT. The measurement may be split into subcounters per WLAN. The measured object may be the IOC (e.g., EP_Xw) representing the Xw interface (contained by the IOC ENBFunction).

The number of failed WT Configuration Updates may be a CC counter. The counter may be triggered on transmission of the WT CONFIGURATION UPDATE FAILURE message by the eNB from the WT. The measurement may be split into subcounters per failure cause, as indicated in section 9.2.4 of TS 36.463. The measured object may be the IOC (e.g., EP_Xw) representing the Xw interface (contained by the IOC ENBFunction).

The number of WT status requests may be a CC counter. The CC counter may be triggered on transmission of the WT STATUS REQUEST message by the eNB from the WT. The measured object is the IOC (e.g., EP_Xw) representing the Xw interface (contained by the IOC ENBFunction).

The number of WT status failures may be a CC counter. The counter may be triggered on receipt of the WT STATUS REQUEST FAILURE message (see TS 36.463) by the eNB from the WT, or if no reply is received for the corresponding WT STATUS REQUEST message. The measurement may be split into subcounters per failure cause. The measured object may be the IOC (e.g., EP_Xw) representing the Xw interface (contained by the IOC ENBFunction).

The number of WT addition requests may be a CC counter. The counter may be triggered on transmission of the WT ADDITION REQUEST message by the eNB from the WT. The measured object may be the IOC (e.g., EP_Xw) representing the Xw interface (contained by the IOC ENBFunction).

The number of WT addition rejections may be a CC counter. The counter may be triggered on receipt of the WT ADDITION REQUEST REJECT message by the eNB from the WT, or if no reply is received for the corresponding WT ADDITION REQUEST message. The measurement may be split into subcounters per failure cause. The measured object may be the IOC (e.g., EP_Xw) representing the Xw interface (contained by the IOC ENBFunction).

The number of eNB-initiated WT modification requests may be a CC counter. The counter may be triggered on transmission of the WT MODIFICATION REQUEST message by the eNB to the WT. The measured object may be the IOC (e.g., EP_Xw) representing the Xw interface (contained by the IOC ENBFunction).

The number of rejected eNB-initiated WT modifications may be a CC counter. The counter may be triggered on receipt of the WT MODIFICATION REQUEST message by the eNB from the WT, or in case no reply may be received for the corresponding WT MODIFICATION REQUEST message. This measurement may be split to subcounters per failure cause. The measured object may be the IOC (e.g., EP_Xw) representing the Xw interface (contained by the IOC ENBFunction).

The number of WT-initiated WT modification requests may be a CC counter. The counter may be triggered on receipt of the WT MODIFICATION REQUIRED message by the eNB from the WT. The measured object may be the IOC (e.g., EP_Xw) representing the Xw interface (contained by the IOC ENBFunction).

The number of refused WT-initiated WT modifications may be a CC counter. The counter may be triggered on transmission of the WT MODIFICATION REFUSE message by the eNB to the WT. This measurement may be split to subcounters per failure cause. The measured object may be the IOC (e.g., EP_Xw) representing the Xw interface (contained by the IOC ENBFunction).

The number of eNB-initiated WT releases may be a CC counter. The counter may be triggered on transmission of the WT RELEASE REQUEST message by the eNB to the WT.

The measured object may be the IOC (e.g., EP_Xw) representing the Xw interface (contained by the IOC ENBFunction).

The number of WT-initiated WT releases may be a CC counter. The counter may be triggered on receipt of the WT RELEASE REQUIRED message by the eNB from the WT. The measured object may be the IOC (e.g., EP_Xw) representing the Xw interface (contained by the IOC ENBFunction).

The above performance measurements for monitoring of user data transmission on the XwAP interface for non-collocated LWA is for the eNB. For the WT: the number of attempted WT Configuration Updates may be a CC counter. The counter may be triggered on transmission of the WT CONFIGURATION UPDATE message (see TS 36.463) by the WT to the eNB. The measurement may be split into subcounters per WLAN. The measured object is the IOC (e.g., WTFunction) representing the WT.

The number of failed WT Configuration Updates may be a CC counter. The counter may be triggered on receipt of the WT CONFIGURATION UPDATE FAILURE message by the WT from the eNB, or in case no reply is received for the corresponding WT CONFIGURATION UPDATE message. The measurement may be split into subcounters per failure cause, as indicated in section 9.2.4 of TS 36.463. The measured object may be the IOC (e.g., WTFunction) representing the WT.

The number of WT status requests may be a CC counter. The CC counter may be triggered on receipt of the WT STATUS REQUEST message by the WT from the eNB. The measured object may be the IOC (e.g., WTFunction) representing the WT.

The number of WT status failures may be a CC counter. The counter may be triggered on transmission of the WT STATUS REQUEST FAILURE message (see TS 36.463) by the WT to the eNB. The measurement may be split into subcounters per failure cause. The measured object is the IOC (e.g., WTFunction) representing the WT.

The number of WT addition requests may be a CC counter. The counter may be triggered on receipt of the WT ADDITION REQUEST message by the WT from the eNB. The measured object is the IOC (e.g., WTFunction) representing the WT.

The number of WT addition rejections may be a CC counter. The counter may be triggered on transmission of the WT ADDITION REQUEST REJECT message by the WT to the eNB. The measurement may be split into subcounters per failure cause. The measured object is the IOC (e.g., WTFunction) representing the WT.

The number of eNB-initiated WT modification requests may be a CC counter. The counter may be triggered on receipt of the WT MODIFICATION REQUEST message by the WT from the eNB. The measured object is the IOC (e.g., WTFunction) representing the WT.

The number of rejected eNB-initiated WT modifications may be a CC counter. The counter may be triggered on receipt of the WT MODIFICATION REQUEST message by the WT from eNB. This measurement may be split to subcounters per failure cause. The measured object is the IOC (e.g., WTFunction) representing the WT.

The number of WT-initiated WT modification requests may be a CC counter. The counter may be triggered on transmission of the WT MODIFICATION REQUIRED message by the WT from the eNB. The measured object is the IOC (e.g., WTFunction) representing the WT.

The number of refused WT-initiated WT modifications may be a CC counter. The counter may be triggered on receipt of the WT MODIFICATION REFUSE message by the WT from the eNB. This measurement may be split to subcounters per failure cause. The measured object is the IOC (e.g., WTFunction) representing the WT.

The number of eNB-initiated WT releases may be a CC counter. The counter may be triggered on receipt of the WT RELEASE REQUEST message by the WT from the eNB. The measured object is the IOC (e.g., WTFunction) representing the WT.

The number of WT-initiated WT releases may be a CC counter. The counter may be triggered on transmission of the WT RELEASE REQUIRED message by the WT to the eNB. The measured object is the IOC (e.g., WTFunction) representing the WT.

Turning to the LWIP, use cases for monitoring user data transmission via WLAN for LWIP. The use cases may be described in section 5.2.2.1 and the corresponding requirements REQ-PM_LWIP_CON-1 as documented in section 6.2.2. The following performance measurements are may be defined in TS 32.425: the number of octets of DL and UL LWIP Encapsulation Protocol (LWIPEP) PDUs; the mean number of UEs associated with WLAN for LWIP; the number of UEs the DL LWIPEP PDUs are transmitted for and the number of UEs the UL LWIPEP PDUs are received for.

The number of octets of DL LWIPEP PDUs may be a CC counter. The counter may be triggered on transmission of the DL LWIPEP PDUs by the eNB. The measurement may be split into subcounters per WLAN. The measured object may be the ENBFunction.

The number of octets of UL LWIPEP PDUs may be a CC counter. The counter may be triggered on receipt of the UL LWIPEP PDUs by the eNB. The measurement may be split into subcounters per WLAN. The measured object may be the ENBFunction.

The mean number of UEs associated with WLAN for LWIP may be a SI counter. The number may be obtained by sampling, at a pre-defined interval, the number of UEs whose WLAN status is "successfulAssociation" in a WLANConnectionStatusReport message (see TS 36.331) received by the eNB and then taking the arithmetic mean. The measured object may be the ENBFunction.

The number of UEs the DL LWIPEP PDUs are transmitted for may be a CC counter. The counter may be incremented when the DL LWIPEP PDUs are transmitted by the eNB for a UE which has not been counted in the collection period. The measurement may be split into subcounters per WLAN. The measured object may be the ENBFunction.

The number of UEs the UL LWIPEP PDUs are received for may be a CC counter. The counter may be incremented when the UL LWAAP PDUs are received by the eNB for a UE which has not been counted in the collection period. The measurement may be split into subcounters per WLAN. The measured object may be the ENBFunction.

The use case on monitoring of RRC procedures for LWA as described in section 5.1.2.3 and the corresponding requirements PM_LWA_CON-1 as documented in section 6.1.2 are now described. In addition, the use case on monitoring of RRC procedures for LWIP as described in section 5.2.2.2 and the corresponding requirements REQ-PM_LWIP_CON-2 as documented in section 6.2.2 are also described.

The following performance measurements are to be defined for eNB in TS 32.425. New performance measurements that are common for LWA and LWIP include the number of WLAN status reports. This measurement may be a CC counter. The CC counter may be triggered on receipt of a WLANConnectionStatusReport message (see TS 36.331) by the eNB from the UE. This measurement may be split into subcounters per the WLAN status (i.e., successfulAssociation, failureWlanRadioLink, failureWlanUnavailable, failureTimeout, suspended, resumed) in the received WLANConnectionStatusReport message. The measured object may be the IOC (e.g., WLANMobilitySet) representing WLAN mobility set managed by the OAM (contained by the IOC ENBFunction).

New performance measurements for the eNB for LWA may include the number of attempted WLAN additions to the LWA WLAN mobility set, the number of successful WLAN additions to the LWA WLAN mobility set, the number of attempted WLAN releases from the LWA WLAN mobility set, the number of successful WLAN releases from the LWA WLAN mobility set, the number of attempted additions of LWA DRB, the number of successful additions of LWA DRB, the number of attempted reconfigurations of LTE DRB to LWA DRB, the number of successful reconfigurations of LTE DRB to LWA DRB, the number of attempted reconfigurations of LWA DRB and the number of successful reconfigurations of LWA DRB.

The number of attempted WLAN additions to the LWA WLAN mobility set may be a CC counter. The counter may be triggered on transmission by the eNB of the RRCConnectionReconfiguration message that includes the wlan-ToAddList in the lwa-MobilityConfig of lwa-Configuration information element. The measured object may be the IOC (e.g., WLANMobilitySet) representing the WLAN mobility set managed by the OAM (contained by the IOC ENBFunction).

The number of successful WLAN additions to the LWA WLAN mobility set may be a CC counter. The counter may be triggered on receipt by the eNB of RRCConnectionReconfigurationComplete message corresponding to a transmitted RRCConnectionReconfiguration message that includes the wlan-ToAddList in the lwa-MobilityConfig of lwa-Configuration information element. The measured object may be the IOC (e.g., WLANMobilitySet) representing the WLAN mobility set managed by the OAM (contained by the IOC ENBFunction).

The number of attempted WLAN releases from the LWA WLAN mobility set may be a CC counter. The counter may be triggered on transmission by the eNB of a RRCConnectionReconfiguration message that includes the wlan-ToReleaseList in the lwa-MobilityConfig of lwa-Configuration information element. The measured object may be the IOC (e.g., WLANMobilitySet) representing WLAN mobility set managed by OAM (contained by the IOC ENBFunction).

The number of successful WLAN releases from the LWA WLAN mobility set may be a CC counter. The counter may be triggered on receipt by the eNB of a RRCConnection-ReconfigurationComplete message corresponding to a transmitted RRCConnectionReconfiguration message that includes the wlan-ToReleaseList in the lwa-MobilityConfig of lwa-Configuration information element. The measured object may be the IOC (e.g., WLANMobilitySet) representing WLAN mobility set managed by OAM (contained by the IOC ENBFunction).

The number of attempted additions of LWA DRB may be a CC counter. The counter may be triggered on transmission by the eNB of a RRCConnectionReconfiguration message that includes the drb-ToAddModList in the radioResourceConfigDedicated information element, and the drb-ToAddModList contains at least one drb-Identity that may be not part of the current UE configuration and the drb-TypeLWA of this DRB set to TRUE. The measured object may be ENBFunction.

The number of successful additions of LWA DRB may be a CC counter. The counter may be triggered on receipt by the eNB of a RRCConnectionReconfigurationComplete message corresponding to a transmitted RRCConnectionReconfiguration message that triggered the measurement "Number of attempted additions of LWA DRB". The measured object may be ENBFunction.

The number of attempted reconfigurations of LTE DRB to LWA DRB may be a CC counter. The counter may be triggered on transmission by the eNB of a RRCConnectionReconfiguration message that includes the drb-ToAddModList in the radioResourceConfigDedicated information element, and the drb-ToAddModList contains at least one drb-Identity that may be part of the current UE configuration but not an LWA DRB and the drb-TypeLWA of this DRB set to TRUE. The measured object may be ENBFunction.

The number of successful reconfigurations of LTE DRB to LWA DRB may be a CC counter. The counter may be triggered on receipt by the eNB of a aRRCConnectionReconfigurationComplete message corresponding to a transmitted RRCConnectionReconfiguration message that triggered the measurement "Number of attempted reconfigurations of LTE DRB to LWA DRB". The measured object may be ENBFunction.

The number of attempted reconfigurations of LWA DRB may be a CC counter. The counter may be triggered on transmission by the eNB of a RRCConnectionReconfiguration message that includes the drb-ToAddModList in the radioResourceConfigDedicated information element, and the drb-ToAddModList contains at least one drb-Identity that may be an LWA DRB of the current UE configuration and the drb-TypeLWA of this DRB set to TRUE. The measured object may be ENBFunction.

The number of successful reconfigurations of LWA DRB may be a CC counter. The counter may be triggered on receipt by the eNB of a RRCConnectionReconfigurationComplete message corresponding to a transmitted RRCConnectionReconfiguration message that triggered the measurement "Number of attempted reconfigurations of LWA DRB". The measured object may be ENBFunction.

New performance measurements for the eNB for LWIP may include the number of attempted WLAN additions to the LWIP WLAN mobility set; the number of successful WLAN additions to the LWIP WLAN mobility set, the number of attempted WLAN releases from the LWIP WLAN mobility set, the number of successful WLAN releases from the LWIP WLAN mobility set, the number of attempted additions of LWIP DRB, the number of successful additions of LWIP DRB, the number of attempted reconfigurations of LTE DRB to LWIP DRB, the number of successful reconfigurations of LTE DRB to LWIP DRB, the number of attempted reconfigurations of LWIP DRB, and the number of successful reconfigurations of LWIP DRB.

The number of attempted WLAN additions to the LWIP WLAN mobility set may be a CC counter. The counter may be triggered on transmission by the eNB of a RRCConnectionReconfiguration message that includes the wlan-ToAddList in the lwip-MobilityConfig of lwip-Configuration information element. The measured object may be the IOC (e.g., WLANMobilitySet) representing WLAN mobility set managed by OAM (contained by the IOC ENBFunction).

The number of successful WLAN additions to the LWIP WLAN mobility set may be a CC counter. The counter may be triggered on receipt by the eNB of a RRCConnection- ReconfigurationComplete message corresponding to a transmitted RRCConnectionReconfiguration message that includes the wlan-ToAddList in the lwip-MobilityConfig of lwip-Configuration information element. The measured object may be the IOC (e.g., WLANMobilitySet) representing WLAN mobility set managed by OAM (contained by the IOC ENBFunction).

The number of attempted WLAN releases from the LWIP WLAN mobility set may be a CC counter. The counter may be triggered on transmission by the eNB of a RRCConnectionReconfiguration message that includes the wlan-ToReleaseList in the lwip-MobilityConfig of imp-Configuration information element. The measured object may be the IOC (e.g., WLANMobilitySet) representing WLAN mobility set managed by OAM (contained by the IOC ENBFunction).

The number of successful WLAN releases from the LWIP WLAN mobility set may be a CC counter. The counter may be triggered on receipt by the eNB of a RRCConnectionReconfigurationComplete message corresponding to a transmitted RRCConnectionReconfiguration message that includes the wlan-ToReleaseList in the lwip-MobilityConfig of lwip-Configuration information element. The measured object may be WLANMobilitySet (contained by the IOC ENBFunction)

The number of attempted additions of LWIP DRB may be a CC counter. The counter may be triggered on transmission by the eNB of a RRCConnectionReconfiguration message that includes the drb-ToAddModList in the radioResourceConfigDedicated information element, and the drb-ToAddModList contains at least one drb-Identity that may be not part of the current UE configuration and the drb-TypeLWIP of this DRB may be included and not set to "eutran". The measured object may be ENBFunction.

The number of successful additions of LWIP DRB may be a CC counter. The counter may be triggered on receipt by the eNB of a RRCConnectionReconfigurationComplete message corresponding to a transmitted RRCConnectionReconfiguration message that triggered the measurement "Number of attempted additions of LWIP DRB". The measured object may be ENBFunction.

The number of attempted reconfigurations of LTE DRB to LWIP DRBmay be a CC counter. The counter may be triggered on transmission by the eNB of a RRCConnectionReconfiguration message that includes the drb-ToAddModList in the radioResourceConfigDedicated information element, and the drb-ToAddModList contains at least one drb-Identity that it an LTE DRB of the current UE configuration and the drb-TypeLWIP of this DRB may be included and not set to "eutran". The measured object may be ENBFunction. The number of successful reconfigurations of LTE DRB to LWIP DRBmay be a CC counter. The counter may be triggered on receipt by the eNB of a RRCConnectionReconfigurationComplete message corresponding to a transmitted RRCConnectionReconfiguration message that triggered the measurement "Number of attempted reconfigurations of LTE DRB to LWIP DRB". The measured object may be ENBFunction.

The number of attempted reconfigurations of LWIP DRB may be a CC counter. The counter may be triggered on transmission by the eNB of a RRCConnectionReconfiguration message that includes the drb-ToAddModList in the radioResourceConfigDedicated information element, and the drb-ToAddModList contains at least one drb-Identity that may be an LWIP DRB of the current UE configuration and the drb-TypeLWIP of this DRB may be included and not set to "eutran". The measured object may be ENBFunction.

The number of successful reconfigurations of LWIP DRB may be a CC counter. The counter may be triggered on receipt by the eNB of a RRCConnectionReconfigurationComplete message corresponding to a transmitted RRCConnectionReconfiguration message that triggered the measurement "Number of attempted reconfigurations of LWIP DRB". The measured object may be ENBFunction.

Turning now to Fault Management of LWA and LWIP, uses case on "Alarm monitoring for non-collocated LWA" as described in section 5.1.3.1 and the corresponding requirements REQ-FM_NonCo_LWA_CON-1 as documented in section 6.1.3, and on "Alarm monitoring for LWIP" as described in section 5.2.3.1 and the corresponding requirements REQ-FM_LWIP_CON-1 as documented in section 6.2.3 are described. The Alarm IRP may be applicable to manage the alarms for LWA and LWIP without the use of changes. The fault of LWA and LWIP may be caused by the fault of WLAN AP, therefore the WLAN alarm notification as described in TS 28.680 can be used by the NM for correlation with the LWA and LWIP related alarms as described in section 5.1.3.1 and section 5.2.3.1. Further alarm information may avoid being defined.

Thus, the NM may be configured to execute the PM for LWA and/or LWIP, by: obtaining the performance measurements related to LWA and/or LWIP; and/or obtaining the performance measurements related to WLAN AP; processing the obtained performance measurements; and/or taking appropriate action(s) per the result of the processing. The NM may also be configured to execute the FM for LWA and/or LWIP, by: obtaining the alarm information related to LWA and/or LWIP; and/or obtaining the alarms related to WLAN AP; processing the obtained alarms; and/or taking appropriate action(s) per the result of the processing. The actions to take based on the performance measurements and alarms may be used, e.g., to mitigate faults by reconfiguring at least one of a 3GPP network or a WLAN access point, creating/modifying/deleting an MOI (IOC instance) to optimize the LWA or LWIP feature, remove a faulty WLAN AP from the WLAN mobility, reset a faulty eNB, WT or WLAN AC/AP or sending personnel to fix a physical entity (e.g., replace faulty hardware of the eNB, WT or WLAN AC/AP).

The EM may be configured to execute the PM for LWA and/or LWIP, by: collecting the performance measurements related to LWA and/or LWIP; providing the PM file information to NM; and collecting the performance measurements related to WLAN AP; processing the collected performance measurements; and/or taking appropriate action(s) per the result of the processing.

The NM may obtain the performance measurements based on a PM file information provided by EM. The PM file information may include the file name and file location. The performance measurements related to LWA and/LWIP may be generated by the eNB or WT. The performance measurements generated by the eNB may be, for each eNB, each Xw interface, or each WLAN mobility set managed by OAM. The performance measurements generated by the WT may be for each WT or each Xw interface. The performance measurements related to the WLAN AP may be measured for each WLAN AP.

The performance measurements generated by the eNB may include one or more of: the number of octets of outgoing or incoming LWAAP PDUs transmitted over Xw interface, the number of UEs for which the outgoing or incoming LWAAP PDUs are transmitted over the Xw interface, the mean number of UEs associated with the WLAN, the number of attempted WT Configuration Updates, the number of failed WT Configuration Updates, the number of WT status requests, the number of WT status failures, the number of WT addition requests, the number of WT addition rejections, the number of eNB initiated WT modification requests, the number of rejected eNB initiated WT modifications, the number of WT initiated WT modification requests, the number of refused WT initiated WT modifications, the number of eNB initiated WT releases, the number of WT initiated WT releases, the number of octets of DL or UL LWIPEP PDUs, the mean number of UEs associated with WLAN for LWIP, the number of UEs the DL or UL LWIPEP PDUs are transmitted for, the number of WLAN status reports, the number of attempted WLAN additions to the LWA WLAN mobility set, the number of successful WLAN additions to the LWA WLAN mobility set, the number of attempted WLAN releases from the LWA WLAN mobility set, the number of successful WLAN releases from the LWA WLAN mobility set, the number of attempted additions of LWA DRB, the number of successful additions of LWA DRB, the number of attempted reconfigurations of LTE DRB to LWA DRB, the number of successful reconfigurations of LTE DRB to LWA DRB, the number of attempted reconfigurations of LWA DRB, the number of successful reconfigurations of LWA DRB, the number of attempted WLAN additions to the LWIP WLAN mobility set, the number of successful WLAN additions to the LWIP WLAN mobility set, the number of attempted WLAN releases from the LWIP WLAN mobility set, the number of successful WLAN releases from the LWIP WLAN mobility set, the number of attempted additions of LWIP DRB, the number of successful additions of LWIP DRB, the number of attempted reconfigurations of LTE DRB to LWIP DRB, the number of successful reconfigurations of LTE DRB to LWIP DRB, the number of attempted reconfigurations of LWIP DRB, or the number of successful reconfigurations of LWIP DRB.

The performance measurements generated by the WT may contain at least one of: the number of octets of outgoing or incoming LWAAP PDUs transmitted over Xw interface, the mean number of UEs associated with WLAN, the number of UEs for which the outgoing or incoming LWAAP PDUs are transmitted over Xw interface, the number of attempted WT Configuration Updates, the number of failed WT Configuration Updates, the number of WT status requests, the number of WT status failures, the number of WT addition requests, the number of WT addition rejections, the number of eNB initiated WT modification requests, the number of rejected eNB initiated WT modifications, the number of WT initiated WT modification requests, the number of refused WT initiated WT modifications, the number of eNB initiated WT releases, or the number of WT initiated WT releases.

The performance measurements related to the WLAN AP may contain at least one of IP.InUnicastPacketWlanAP; IP.OutUnicastPacketWlanAP; IP.InMulticastPacketWlanAP; IP.OutMulticastPacketWlanAP; IP.InBroadcastPacketWlanAP; IP.OutBroadcastPacketWlanAP; MAC.SuccRtsWlanAP; MAC.FailRtsWlanAP; MAC.FailAckWlanAP; MAC.successMpduWlanAP; MAC.failedMpduWlanAP or NumberOfAssociatedStation.

Processing the performance measurements may include correlation of the performance measurements related to LWA and/or LWIP and the performance measurements related to the WLAN AP.

The action may be to reconfigure the 3GPP networks and/or WLAN AP.

The NM may be configured to execute the Fault Management (FM) for LWA and/or LWIP, by: obtaining the alarms related to LWA and/or LWIP from EM; and/or obtaining the alarms related to WLAN AP from EM; processing the obtained alarms; and/or taking appropriate action(s) per the result of the processing.

The EM may be configured to execute the FM for LWA and/or LWIP, by: reporting the alarms related to LWA and/or LWIP to NM; and/or reporting the alarms related to WLAN AP to NM; processing the alarms; and/or taking appropriate action(s) per the result of the processing.

Processing the alarms may include correlation of the alarms related to LWA and/or LWIP and the alarms related to WLAN AP. The action may include solving the fault (e.g., resetting the system) of the 3GPP networks and/or WLAN AP.

Thus, in the non-collocated LWA, to enable the eNB to perform the LWA for a UE, the WT provides the WLAN information to the eNB by the Xw-AP interface, during an Xw Setup procedure and WT Configuration Update procedure. The WLAN information is provisioned to the WT, which then can provide it to the eNB as above. The NM requests the EM to provision the WLAN information to the WT. Since one WT may have a Xw interface with multiple eNBs, the LWA relations is also provisioned. The EM configures the WLAN information and LWA relations to WT. The WLAN information contains at least one of the BSS Item, the SSID, and/or the HESSID IEs.

When the Xw Setup procedure is initiated by the NB, the WT provides the WLAN information to the eNB during Xw Setup procedure based on the provisioned WLAN information and LWA relations. If the WLAN information or LWA relation provisioned by OAM is changed and it impacts an existing Xw interface, the WT updates the WLAN information to the eNB by the WT Configuration Update procedure. The WT may not provide all of the WLAN information received from NM/EM to an eNB, but only provide the information needed for LWA with the eNB. The WLAN information and LWA relation are provisioned to the WT for non-collocated LWA.

In the collocated LWA, the interface between LTE and WLAN is up to implementation. The WLAN information is used by the eNB to perform the LWA operation (e.g., WT Addition Preparation to allocate the WLAN resources for specific E-RABs to the UE). So, WLAN information is provisioned to the eNB for the collocated LWA. The collocated LWA is supported by the eNB. The NM requests the EM to provision the WLAN information for collocated LWA to the eNB. The EM configures the WLAN information to the eNB. The WLAN information contains at least one of the BSS, the SSID, and/or the HESSID IEs. The WLAN information is provisioned to the eNB for collocated LWA.

The WLAN mobility set enables mobility for LWA (both collocated LWA and non-collocated LWA). The UE configured with LWA bearer(s) may perform mobility between WLAN APs belonging to the mobility set without informing the eNB. A UE is connected to at most one mobility set at the same time. All APs belonging to a mobility set share a common WT which terminates Xw-C and Xw-U. One eNB may have multiple WLAN mobility sets, because WLAN APs may be distributed in different locations thus have different coverages and the eNB may connect to multiple WTs. The WLAN mobility sets is established and maintained correctly to ensure the UE mobility works properly for LWA.

The operator configures the WLAN mobility sets since the operator may have some information that the eNB does not have, such as the location, capability and capacity of the WLAN APs. The configuration of the WLAN mobility set may include creation of a WLAN mobility set, addition/modification/removal of WLAN AP information to/in/from a WLAN mobility set, and deletion of a WLAN mobility set. The NM requests the EM to configure the WLAN mobility sets to an eNB for LWA (both collocated LWA and non-collocated LWA). The configuration request may be one or more of: creation of a WLAN mobility set; modification of a WLAN mobility set, including addition of WLAN AP information to the WLAN mobility set; modification of WLAN AP information in the WLAN mobility set; removal of WLAN AP information from a WLAN mobility set; or deletion of a WLAN mobility set. The EM configures the eNB with the WLAN mobility set accordingly.

The eNB configures mobility set information, which may be the full set or subset of a WLAN mobility set provided by NM/EM, to a UE. For example if some WLAN AP is overloaded, it may not be included in the mobility set information configured to the UE. For non-collocated LWA, the eNB propagates the mobility set information that is configured to the UE to WT.

The value of the performance measurements depends on whether there are UEs supporting LWA during the collection period. The measurement value is zero if the LWA is in operation on the eNB but no UEs are supporting LWA during the collection period.

In the non-collocated LWA scenario, the Xw user plane interface (Xw-U) is defined between eNB and WT. The Xw-U interface supports flow control based on feedback from WT. The Xw-U interface is used to deliver LWAAP PDUs between the eNB and WT. For LWA, the S1-U terminates in the eNB and, if Xw-U user data bearers are associated with E-RABs for which the LWA bearer option is configured, the user plane data is transferred from the eNB to WT using the Xw-U interface. The operator may obtain the performance regarding user data transmission over the Xw interface for LWA.

The eNB and/or WT generates performance measurements related to user data transmission over the Xw interface for LWA and reports to the EM (how the eNB/WT reports the PM data to the EM may be vendor specific). The performance measurements include: user data volume transmitted over Xw interface for DL and UL. The data may be split to subcounters per WLAN; successful rate of the user data transmission over Xw interface; the number of UEs associated with WLAN in a WT; and the number of UEs who have transmitted data via a WT. The data may be split to subcounters per WLAN. The EM informs the NM that the PM data file is ready with the information about file name, file location, etc. The NM gets the PM data file according to the file information provided by the EM. The NM gets the performance measurements related to user data transmission over the Xw interface for LWA.

The Xw Application Protocol (XwAP) procedures of the control plane between an eNB and WT are used for non-collocated LWA. The XwAP procedures may be UE-associated or non UE-associated. The WT Configuration Update, WLAN Status Reporting and LTE-WLAN Aggregation procedures are used to evaluate the performance of LWA to be executed for the UE, thus the performance of these XwAP procedures is to be monitored.

The eNB and/or WT generate the performance measurements for the following XwAP procedures and report to EM (how the eNB/WT reports the PM data to EM is vendor specific): WT Configuration Update (i.e. the number of attempts, successes/failures); WLAN Status Reporting (i.e. the number of requests, successes/failures); and LTE-WLAN Aggregation procedures (i.e. the number of attempts/requests, successes/failures), including WT Addition, WT Association Confirmation, eNB Initiated WT Modification, WT Initiated WT Modification, eNB Initiated WT Release and WT Initiated WT Release). The EM informs the NM that the PM data file is ready with the information about file name, file location, etc. The NM gets the PM data file according to the file information provided by the EM.

The following RRC procedures between the eNB and UE are used for LWA (both collocated LWA and non-collocated LWA): LWA WLAN mobility set configuration; WLAN connection status reporting; and LWA specific DRB addition or reconfiguration. The performance of these RRC procedures are monitored for LWA (both collocated LWA and non-collocated LWA).

The eNB and/or WT generate the performance measurements for the RRC procedures and report to EM (how the eNB/WT reports the PM data to EM is vendor specific): LWA WLAN mobility set configuration (i.e. the number of attempts, successes/failures); WLAN connection status reporting (i.e. the number of successful associations, connection failures); and LWA specific DRB addition or reconfiguration (i.e. the number of attempted additions, successful/failed additions, attempted reconfigurations, successful/failed reconfigurations). The EM informs the NM that the PM data file is ready with the information about file name, file location, etc. The NM gets the PM data file according to the file information provided by EM.

For the non-collocated LWA scenario, the operator should know whether the non-collocated LWA is running healthily. Therefore, the operator monitors the alarms related to the non-collocated LWA, such as the fault on a WT, or the malfunction of an Xw interface. The operator may take actions to solve the problems.

The EM monitors the alarms related to the non-collocated LWA, including the alarms for a WT and the alarms for an Xw interface. The EM reports the alarms related to the non-collocated LWA to the NM. The alarms reported to NM include detailed information such as probable cause, location of the faulty part (e.g., WT, WLAN AP connected to a WT, or Xw eNB or WT side of the Xw interface), to facilitate operator to solve the problems. The NM takes appropriate actions to solve the problems when necessary.

For LWIP, the IP Packets transferred between the UE and LWIP-SeGW are encapsulated using IPsec in order to provide security to the packets that traverse WLAN. The IP packets are then transported between the LWIP-SeGW and eNB. The end to end path between the UE and eNB via the WLAN network is referred to as the LWIP tunnel. For the DL of a data bearer, the packets received by the eNB from the IPsec tunnel are forwarded directly to upper layers. UL bearer packets sent over the LWIP tunnel are encapsulated using LWIPEP. The operator configures the eNB with information (e.g., IP address, location) for LWIP, such as the IP address of LWIP-SeGW and identifiers (BSSID, HESSID and SSID of WLAN APs for LWIP.

The NM requests the EM to configure the eNB with LWIP related information, which includes: the IP address of each LWIP-SeGW, which is to be used by the UE to establish the IPsec tunnel with LWIP-SeGW, and to be used by the eNB to setup connection with LWIP-SeGW for the LWIP tunnel; and identifiers (BSSID, HESSID and SSID) of the WLAN APs for LWIP. The EM configures the eNB with the LWIP related information accordingly. The eNB uses the configured information for LWIP.

The use case on configuration of WLAN mobility sets for LWA 1.3 is applicable to configuration of WLAN mobility sets for LWIP, except the WT related procedures and collocated/non-collocated concept do not apply to LWIP.

The value of the performance measurements related to the use cases depends on whether there are UEs supporting LWIP during the collection period. The measurement value is zero if the LWIP is in operation on the eNB but no UEs are supporting LWIP during the collection period.

The IP Packets transferred between the UE and LWIP-SeGW are encapsulated using IPsec in order to provide security to the packets that traverse WLAN. The end to end path between the UE and eNB via the WLAN network is referred to as the LWIP tunnel. A single IPSec tunnel is used per UE for all the data bearers that are configured to send and/or receive data over WLAN. Each data bearer may be configured so that traffic for that bearer can be routed over the IPsec tunnel in only downlink, only uplink, or both uplink and downlink over the WLAN. SRBs are carried over LTE only. The eNB configures specific bearer(s) to use the IPsec tunnel. The operator should know the performance regarding user data transmission via the WLAN for LWIP.

The eNB generates performance measurements related to user data transmission via WLAN for LWIP, and reports to the EM (how the eNB reports the PM data to EM is vendor specific). The performance measurements may include: user data volume transmitted or received via WLAN. The data may be split to subcounters per WLAN AP; the number of UEs associated with WLAN for LWIP; and the number of UEs who have transmitted or received data via a WLAN for LWIP. The data may be split to subcounters per WLAN AP. The EM informs the NM that the PM data file is ready with the information about file name, file location, etc. The NM gets the PM data file according to the file information provided by the EM.

The RRC procedures between the eNB and UE are used for LWIP: LWIP WLAN mobility set configuration; WLAN connection status reporting; and LWIP specific DRB addition or reconfiguration. The performance of these RRC procedures are monitored for LWIP.

The eNB generates the performance measurements for the RRC procedures and reports to the EM (how the eNB reports the PM data to EM is vendor specific): LWIP WLAN mobility set configuration (i.e. the number of attempts, successes/failures); WLAN connection status reporting (i.e. the number of successful associations, connection failures); LWIP specific DRB addition or reconfiguration (i.e. the number of attempted additions, successful/failed additions, attempted reconfigurations, successful/failed reconfigurations). The EM informs the NM that the PM data file is ready with the information about file name, file location, etc. The NM gets the PM data file according to the file information provided by the EM.

The operator supervises whether the LWIP is running normally. Therefore, the operator monitors the alarms related to the LWIP, such as the connection failure with LWIP-SeGW from eNB, data cannot be transmitted/received via an associated WLAN, etc. The operator may take actions to mitigate the faults.

The EM monitors the alarms related to the LWIP on an eNB, and reports to the NM. The alarms reported to the NM includes detailed information such as probable cause, location of the faulty part (e.g., connection failure with an LWIP-SeGW, data cannot be transmitted via an associated WLAN, etc.) to facilitate operator to mitigate the faults. The NM takes appropriate actions to solve the problems.

Figure 10:
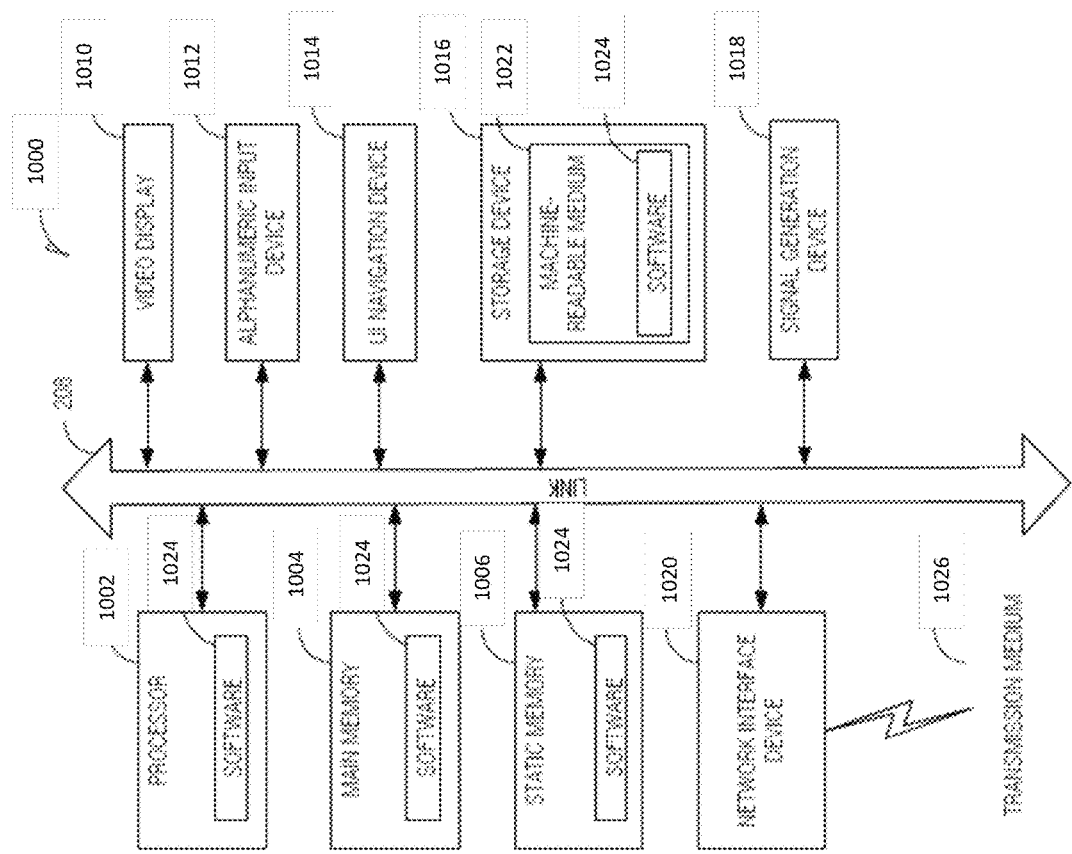
FIG. 10 illustrates a block diagram of a device in some embodiments.

FIG. 10 illustrates a block diagram of a device in some embodiments. The device may be a UE, eNB, WLAN or NM, among others. The device 1000 may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The device 1000 may include a hardware processor 1002 (e.g., a central processing unit (CPU), a GPU, a hardware processor core, or any combination thereof), a main memory 1004 and a static memory 1006, some or all of which may communicate with each other via an interlink (e.g., bus) 1008. The main memory 1004 may contain any or all of removable storage and non-removable storage, volatile memory or non-volatile memory. The device 1000 may further include a display unit 1010 such as a video display, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The communication device 1000 may additionally include a storage device (e.g., drive unit) 1016, a signal generation device 1018 (e.g., a speaker), a network interface device 1020, and one or more sensors, such as a global positioning system (GPS) sensor, compass, accelerometer, or other sensor. The device 1000 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a non-transitory machine readable medium 1022 (hereinafter simply referred to as machine readable medium) on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, and/or within the hardware processor 1002 during execution thereof by the communication device 1000. While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the device 1000 and that cause the device 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 1024 may further be transmitted or received over a communications network using a transmission medium 1026 via the network interface device 1020 utilizing any one of a number of transfer protocols (e.g., frame relay, interne protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a LTE family of standards, a Universal Mobile Telecommunications System (UMTS) family of standards, peer-to-peer (P2P) networks, a NG standard among others. In an example, the network interface device 1020 may include one or more physical jacks (e.g., Ethernet, coaxial, or phone jacks) or one or more antennas to connect to the transmission medium 1026.

In the above Detailed Description, various features may be grouped together to streamline the disclosure. However, the claims applicable to these features may not set forth every feature disclosed herein as embodiments may feature a subset of said features. Further, embodiments may include fewer features than those disclosed in a particular example.

What is claimed is:

1. An apparatus, comprising:
    one or more processors arranged to cause a network manager (NM) to:
        generate, for transmission to an element manager (EM), a management request for management of an Information Object Class (IOC) instance for at least one of LTE Wireless Local Area Network (WLAN) Aggregation (L WA) or LTE WLAN Radio Level Integration with IPsec Tunnel (LWIP), the request requesting the EM to one of:
            provision WLAN or L WIP-related information to one of a base station or a WLAN Termination (WT), or
            configure a WLAN mobility set to the base station;
        obtain, from the IOC instance, at least one of performance measurements or alarms related to the at least one of the L WA or L WIP; and
        take an action to modify the network based on the at least one of the performance measurements or alarms.

2. The apparatus of claim 1, wherein:
    management of the IOC instance comprises creation of the IOC instance, modification of the IOC instance or deletion of the IOC instance, and
    the IOC instance comprises:
        an ENBFunction IOC representing the base station;
        a WTFunction IOC representing the WT;
        an EP_Xw IOC representing an Xw interface between the base station and the WT; or
        a WLANMobilitySet IOC representing a WLAN mobility set managed by management system for at least one of LWA or LWIP.

3. The apparatus of claim 2, wherein the ENBFunction IOC comprises an attribute that indicates information of an L WIP Secure Gateway (SeGW), the attribute comprising at least one of an identifier or an Internet Protocol (IP) address of the L WIP SeGW.

4. The apparatus of claim 2, wherein the WTFunction IOC inherits from a ManagedFunction IOC, comprises attributes that indicate information of a WLAN, the attributes comprising an identifier of the WLAN, an operational status of the WLAN, a geographical location of the WLAN and an identifier of a base station with which the WLAN has an L WA relation.

5. The apparatus of claim 2, wherein the EP Xw IOC inherits from an EP RP IOC and is contained by at least one of the ENBFunction IOC or the WTFunction IOC.

6. The apparatus of claim 5, wherein multiple instances of the EP Xw IOC are contained by the WTFunction IOC to indicate that the WT has relations with multiple base stations.

7. The apparatus of claim 5, wherein multiple instances of the EP Xw IOC are contained by the ENBFunction IOC to indicate that the base station cNB has relations with multiple WTs.

8. The apparatus of claim 2, wherein the WLANMobilitySet IOC inherits from a ManagedFunction IOC and comprises attributes that indicate information of a WLAN, the attributes comprising an identifier of the WLAN, an operational status of the WLAN, a geographical location of the WLAN and an indication of whether L WA or L WIP is supported between the base station and the WLAN.

9. The apparatus of claim 1, wherein:
    the performance measurements are obtained based on performance management (PM) file information provided by the EM, the PM file information comprising a file name and file location, and
    the performance measurements are generated by the base station or the WT.

10. The apparatus of claim 9, wherein:
    performance measurements generated by the base station are for each base station, each Xw interface, or each WLAN mobility set managed by Operations, Administration and Maintenance (OAM),
    performance measurements generated by the WT are for each WT or each X w interface, or
    performance measurements related to a WLAN access point (AP) are measured for each WLAN AP.

11. The apparatus of claim 9, wherein the performance measurements generated by the base station comprise:

a number of octets of incoming or outgoing LTE-WLAN Aggregation Adaptation Protocol (LWAAP) packet data units (PDUs) transmitted over an Xw interface,
a mean number of user equipments (UEs) associated with a WLAN,
a number of UEs for which the incoming or outgoing LWAAP PDU s are transmitted over the Xw interface
a number of attempted or failed WT Configuration Updates;
a number of WT status requests or failures;
a number of WT addition requests or rejections;
a number of base station initiated WT modification requests or rejected base station initiated WT modifications;
a number of WT initiated WT modification requests or refused WT initiated WT modifications;
a number of base station initiated WT releases or WT initiated WT releases;
a number of octets of downlink (DL) or uplink (UL) L WIP Encapsulation Protocol (LWIPEP) PDUs;
a mean number of UEs associated with WLAN for LWIP;
a number of UEs the DL LWIPEP PDUs are transmitted for or the UL LWIPEP PDUs are received for; a number of WLAN status reports;
a number of attempted or successful WLAN additions to a L WA WLAN mobility set;
a number of attempted or successful WLAN releases from the L WA WLAN mobility set;
a number of attempted or successful additions of L WA dedicated radio bearer (DRB);
a number of attempted or successful reconfigurations of LTE DRB to LWADRB;
a number of attempted or successful reconfigurations of LWA DRB;
a number of attempted or successful WLAN additions to the L WIP WLAN mobility set;
a number of attempted or successful WLAN releases from the L WIP WLAN mobility set;
a number of attempted or successful additions of LWIP DRB;
a number of attempted or successful reconfigurations of LTE DRB to LWIP DRB; and
a number of attempted or successful reconfigurations of LWIP DRB.

12. The apparatus of claim 9, wherein the PM measurements generated by the WT comprise:
a number of octets of incoming or outgoing LTE-WLAN Aggregation Adaptation Protocol (LWAAP) packet data units (PDUs) transmitted over Xw interface;
a mean number of user equipments (UEs) associated with a WLAN;
a number of UEs for which the incoming or outgoing L WAAP PDU s are transmitted over an Xw interface;
a number of attempted or failed WT Configuration Updates;
a number of WT status requests or failures;
a number of WT addition requests or rejections;
a number of base station initiated WT modification requests or rejected base station initiated WT modifications;
a number of WT initiated WT modification requests or refused WT initiated WT modifications; and
a number of base station or WT initiated WT releases.

13. The apparatus of claim 9, wherein the performance measurements related to a WLAN access point (AP) comprise:

IP.InUnicastPacketWlanAP;
IP. OutUnicastPacketWlanAP;
IP.InMulticastPacketWlanAP;
IP. OutMulticastPacket WlanAP;
IP.InBroadcastPacketWlanAP;
IP. OutBroadcastPacketWlanAP;
MAC. SuccRtsWlanAP;
MAC.FailRtsWlanAP;
MAC.FailAckWlanAP;
MAC. successMpduWlanAP;
MAC.failedMpduWlanAP; and
NumberOfAssociatedStation.

14. The apparatus of claim 1, wherein the one or more processors are further configured to correlate performance measurements related to at least one of L WA or L WIP and performance measurements related to a WLAN access point (AP).

15. The apparatus of claim 1, wherein the action comprises creation, modification or deletion of the IOC instance to optimize the L WA or LWIP, removal of a faulty WLAN AP from a WLAN mobility set, reset a faulty base station, WT or WLAN AC or access point (AP) or replacement of faulty hardware of the base station, WT or WLAN AC or AP.

16. A non-transitory machine-readable storage device including instructions stored thereon that, when executed by a machine, configure the machine to perform operations comprising:
receiving, at an element manager (EM) from a network manager (NM), a management request for management of an Information Object Class (IOC) instance for at least one of LTE Wireless Local Area Network (WLAN) Aggregation (L WA) or LTE WLAN Radio Level Integration with IPsec Tunnel (LWIP), the request requesting the EM to one of:
provision WLAN or L WIP-related information to one of a base station an evolved or a WLAN Termination (WT), or
configure a WLAN mobility set to the base station; and
managing the IOC instance based on the request.

17. The medium of claim 16, wherein the instructions, when executed by the machine, further configure the machine to perform operations comprising:
collecting, from network functions, at least one of performance measurements or alarms related to the at least one of L WA or L WIP;
providing the at least one of performance measurements or alarms to the NM; and
taking a network action related to the at least one of the L WA or L WIP based on the at least one of the performance measurements or alarms.

18. The medium of claim 16, wherein:
managing the IOC instance comprises creating, modifying or deleting the IOC instance, and
the IOC instance comprises at least one of:
an ENBFunction IOC representing the base station, the ENBFunction IOC comprising at least one attribute that indicates information of an LWIP Secure Gateway (SeGW), the at least one attribute comprising at least one of an identifier or an Internet Protocol (IP) address of the L WIP SeGW,
a WTFunction IOC representing the WT,
an EP Xw IOC representing an Xw interface between the base station cNB and the WT, or
a WLANmobilityset IOC representing a WLAN mobility set managed by a management system for L WA and L WIP.

19. An apparatus, comprising:
one or more processors arranged to cause an element manager (EM) to:
  obtain, from a network manager (NM), a management request for management of an Information Object Class (IOC) instance for at least one of LTE Wireless Local Area Network (WLAN) Aggregation (LWA) or LTE WLAN Radio Level Integration with IPsec Tunnel (L WIP) the request requesting the EM to one of:
    provision WLAN or L WIP-related information to one of a base station or a WLAN Termination (WT), or
    configure a WLAN mobility set to the base station; and
  manage the IOC instance based on the request.

20. The apparatus of claim 19, wherein:
the one or more processors are further arranged to:
  collect, from network functions, at least one of performance measurements or alarms related to the at least one of L WA or L WIP;
  provide the at least one of performance measurements or alarms to the NM; and
  take a network action related to the at least one of the L WA or L WIP based on the at least one of the performance measurements or alarms;
management of the IOC instance comprises at least one of creation, modification or deletion of the IOC instance, and the IOC comprises at least one of:
  an ENBFunction IOC representing the base station, the ENBFunction IOC comprising at least one attribute that indicates information of an LWIP Secure Gateway (SeGW), the at least one attribute comprising at least one of an identifier or an Internet Protocol (IP) address of the L WIP SeGW,
  a WTFunction IOC representing the WT,
  an EP Xw IOC representing an Xw interface between the base station and the WT, or
  a WLANmobilityset IOC representing a WLAN mobility set managed by management system for L WA and L WIP.

* * * * *